US012798619B2

(12) United States Patent
Duran et al.

(10) Patent No.: US 12,798,619 B2

(45) Date of Patent: Nov. 17, 2026

(54) PROACTIVE VEHICLE AQUAPLANING MITIGATION SYSTEM

(71) Applicant: International Business Machines Corporation, Armonk, NY (US)

(72) Inventors: Irving A. Duran, Dubuque, IA (US); Jacob Ryan Jepperson, St. Paul, MN (US); Sarbajit Kumar Rakshit, Kolkata (IN); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 18/884,353

(22) Filed: Sep. 13, 2024

(65) Prior Publication Data

US 2026/0077787 A1 Mar. 19, 2026

(51) Int. Cl.

*B60W 60/00* (2020.01)
*B60K 35/21* (2024.01)

(Continued)

(52) U.S. Cl.

CPC ......... *B60W 60/0016* (2020.02); *B60K 35/21* (2024.01); *B60W 10/30* (2013.01); *H04L 67/125* (2013.01)

(58) Field of Classification Search

CPC ... B60W 60/0016; B60W 10/30; B60K 35/21; H04L 67/125

(Continued)

(56) References Cited

U.S. PATENT DOCUMENTS 3,544,370 A * 12/1970 Wrede .................. B60B 39/026 15/340.1
3,680,885 A * 8/1972 DeCardi ................ B64C 25/32 291/1

(Continued)

FOREIGN PATENT DOCUMENTS

CN 103038109 A 4/2013
CN 115179928 A 10/2022

(Continued)

OTHER PUBLICATIONS

Anonymous, "Aquaplaning", Wikipedia, https://en.wikipedia.org/wiki/Aquaplaning, (Retrieved: Aug. 15, 2024), 7 pages.

(Continued)

*Primary Examiner* — Kurt Philip Liethen
*Assistant Examiner* — John D Bailey
(74) *Attorney, Agent, or Firm* — Cantor Colburn LLP; Joseph P. Curcuru

(57) ABSTRACT

A system includes at least one sensor and a controller in signal communication with the sensor. The at least one sensor is configured to output at least one signal indicating water on a road on which at least one vehicle travels and vehicle-generated data resulting from operation of the at least one vehicle. The controller is configured to receive the signal and is configured to generate situational data based on the vehicle-generated data, generate a simulated aquaplaning event corresponding to the at least one vehicle based on one or both of the vehicle-generate data and the situational data, and control the at least one vehicle based on the simulated aquaplaning event.

20 Claims, 14 Drawing Sheets

(51) Int. Cl.
*B60W 10/30* (2006.01)
*H04L 67/125* (2022.01)

(58) Field of Classification Search
USPC ........................................................ 701/45
See application file for complete search history.

(56) References Cited

U.S. PATENT DOCUMENTS 5,765,119 A * 6/1998 Otabe .................... B60T 8/172 701/80
5,777,731 A * 7/1998 McBride .................. G01B 5/06 356/243.1
6,195,157 B1 * 2/2001 Yamashita .............. G01S 7/497 180/169
6,298,297 B1 * 10/2001 Colby .................... B60K 28/16 701/87
8,626,382 B2 * 1/2014 Obradovich .......... G06F 16/221 701/1
9,493,145 B2 * 11/2016 Mehr ...................... B60T 8/172
9,645,577 B1 * 5/2017 Frazzoli ................ B60W 30/09
9,932,022 B2 * 4/2018 Weston ................. B60T 8/1725
10,160,454 B2 * 12/2018 Barthel ............... B60W 30/143
10,168,174 B2 * 1/2019 Tomatsu .............. G01C 21/365
10,202,204 B1 * 2/2019 Daidzic .................. B64C 25/10
10,540,456 B2 * 1/2020 Nica ................... B60W 30/095
10,549,734 B2 * 2/2020 Hofmann .............. B60W 40/06
10,916,129 B2 * 2/2021 Castelli ................. H04W 76/10
11,055,934 B1 * 7/2021 Just ....................... B60C 11/246
11,260,867 B2 * 3/2022 Datta Gupta ......... B60W 40/06
11,586,200 B2 * 2/2023 Fadaie ................. G05D 1/0022
11,639,185 B2 * 5/2023 Beaurepaire .......... B60W 30/02 701/26
11,679,781 B2 * 6/2023 Kim ................... G01C 21/3889 701/25
11,993,260 B2 * 5/2024 Sams .................. B60W 30/146
12,115,993 B2 * 10/2024 Marlett ................. B60W 40/02
12,503,117 B2 * 12/2025 Ghannam ....... B60W 30/18172
2003/0101805 A1 * 6/2003 Raab ..................... B60W 40/06 73/115.01
2004/0036590 A1 * 2/2004 Elsner ..................... B60T 8/171 340/531
2005/0085987 A1 * 4/2005 Yokota ................ B60C 23/0477 73/146
2005/0268708 A1 * 12/2005 Satou ...................... B60T 8/172 73/146
2006/0006990 A1 * 1/2006 Obradovich .... B60W 30/18145 340/576
2007/0000702 A1 * 1/2007 Yoshida ................. B60K 15/07 429/442
2007/0124027 A1 * 5/2007 Betzitza ................ B60W 40/09 701/1
2008/0245456 A1 * 10/2008 Spetler .................. B60T 8/1725 73/146
2011/0160964 A1 * 6/2011 Obradovich .......... G06F 16/221 701/41
2013/0035836 A1 * 2/2013 Mehr ...................... B60T 8/172 701/1
2013/0096779 A1 * 4/2013 Erlacher .............. B60N 2/0276 701/45
2013/0269848 A1 * 10/2013 Kaba ....................... B60C 11/03 152/209.25
2014/0090461 A1 * 4/2014 Cuttino ................. G01M 17/02 73/118.01
2014/0094989 A1 * 4/2014 Dadu ................... G07C 5/0816 701/1
2014/0195118 A1 * 7/2014 Okubo .................. B60W 10/18 701/41
2015/0005982 A1 * 1/2015 Muthukumar ........ B60T 8/1725 701/1
2015/0046071 A1 * 2/2015 Clarke ............ B60W 30/18018 701/112
2015/0090383 A1 * 4/2015 Lepisto ............... B60C 11/0304 152/209.18
2015/0102594 A1 * 4/2015 Blandina ............... B60B 39/026 280/855
2015/0153266 A1 * 6/2015 Mack .................. B60W 40/064 73/9
2015/0166072 A1 * 6/2015 Powers ............... B60W 40/076 701/1
2015/0363651 A1 * 12/2015 Zhao ...................... G06V 20/56 382/104
2016/0016558 A1 * 1/2016 Santacroce ........... B60B 39/026 29/428
2016/0089933 A1 * 3/2016 Toros ...................... B60B 39/10 701/36
2016/0093210 A1 * 3/2016 Bonhomme ......... G08G 1/0129 340/905
2017/0161570 A1 * 6/2017 Zhao .................... G06V 20/588
2017/0161572 A1 * 6/2017 Zhao ...................... G06V 10/25
2017/0161573 A1 * 6/2017 Zhao .................... G06V 20/588
2017/0162045 A1 * 6/2017 Zhao .................... G08G 1/0965
2017/0282869 A1 * 10/2017 Tong ......................... B60T 7/22
2018/0059677 A1 * 3/2018 Zhao ......................... B60T 8/00
2018/0060674 A1 * 3/2018 Zhao .................... G06V 10/811
2018/0265054 A1 * 9/2018 Hofmann ............ B60W 40/068
2018/0293448 A1 * 10/2018 Hartmann ............... B60T 8/172
2020/0192403 A1 * 6/2020 Silver ................... B60W 10/04
2020/0216085 A1 * 7/2020 Bobier-Tiu ........... B60W 40/08
2020/0223408 A1 * 7/2020 Goto ..................... B60T 13/662
2020/0339129 A1 * 10/2020 Weissenmayer ...... B60W 40/06
2020/0342760 A1 * 10/2020 Vassilovski ..... B60W 30/18159
2020/0406897 A1 * 12/2020 Hartmann ............. B60W 40/06
2021/0086786 A1 * 3/2021 Kretschmann ........ B60W 40/06
2021/0101601 A1 * 4/2021 Datta Gupta ......... B60W 10/10
2021/0208274 A1 * 7/2021 Weissenmayer ........ G01S 15/88
2021/0354723 A1 * 11/2021 McCool ............... G06V 20/588
2021/0370922 A1 * 12/2021 Smith ................... B60W 30/09
2022/0119010 A1 * 4/2022 Beaurepaire .......... B60W 30/02
2023/0083999 A1 * 3/2023 Marlett ................. B60W 40/02 701/1
2023/0106644 A1 * 4/2023 Shenfeld ............... B60W 10/18 701/26
2023/0140569 A1 * 5/2023 Foster ...................... B60Q 1/46 701/400
2023/0249710 A1 * 8/2023 Perumalla ........ G08G 1/096758 701/24
2023/0394190 A1 * 12/2023 Wilson .................... G06F 30/15
2024/0073093 A1 * 2/2024 Fang ...................... G07C 5/008
2024/0123859 A1 * 4/2024 Yang ..................... B60L 53/665
2024/0175679 A1 * 5/2024 Tokuda ............... B60W 40/064
2024/0270253 A1 * 8/2024 Ghannam ....... B60W 30/18172
2025/0036123 A1 * 1/2025 Konrardy .............. B60W 10/04
2025/0101696 A1 * 3/2025 Cont-Stoica .............. E01H 3/04
2025/0333057 A1 * 10/2025 Satre ................... B60W 30/143
2025/0363835 A1 * 11/2025 Jung ..................... B60W 50/14
2025/0368235 A1 * 12/2025 Buerkle ............ B60W 60/0051

FOREIGN PATENT DOCUMENTS

CN 109427199 B 11/2022
JP 6844581 B2 3/2021
KR 100726999 B1 6/2007
WO 2023275709 A1 1/2023

OTHER PUBLICATIONS

Anonymous, "Calculating Hydrodynamic Lift?", Boatdesign.net, https://www.boatdesign.net/threads/calculating-hydrodynamic-lift.17751/, (Retrieved: Aug. 15, 2024), 2007, 4 pages.

Anonymous, "Road hazard prevention experience while driving through severe weather", IP.com, IPCOM000260333D, Nov. 12, 2019, 4 pages.

Anonymous, "Use Cases of Augmented Reality in Vehicles?", Basemark, https://www.basemark.com/news/use-cases-of-augmented-reality-in-vehicles/, (Retrieved: Aug. 15, 2024), 13 pages.

Anonymous, "What is Aquaplaning?", Prestone, https://www.prestoneuk.com/news/what-is-aquaplaning/, (Retrieved: Aug. 15, 2024), 2018, 8 pages.

(56) References Cited

OTHER PUBLICATIONS

Anonymous, "Why Are Roads Slippery When Wet ??", Wonderopolis, https://wonderopolis.org/wonder/why-are-roads-slippery-when-wet, (Retrieved: Aug. 15, 2024), 3 pages.

J. McCauley, "Hydrodynamic Lift on Boats", http://arxiv.org/abs/1808.03313, (Retrieved: Aug. 15, 2024), 29 pages.

* cited by examiner

PROACTIVE VEHICLE AQUAPLANING MITIGATION SYSTEM

BACKGROUND

The present invention generally relates to automotive vehicles, and more specifically, to computer systems, computer-implemented methods, and computer program products configured to perform proactive vehicle aquaplaning mitigation.

Aquaplaning, also known as hydroplaning, happens when a layer of water forms between a vehicle's tires and the road, causing a loss of traction. Unlike simple wet pavement, which reduces traction but still allows some control, aquaplaning fully disconnects the tires from the road surface and causes a loss of traction that prevents the vehicle from responding to steering, braking, or acceleration inputs. If all wheels aquaplane at once, the vehicle essentially becomes uncontrollable and feels similar to when the vehicle is driven on icy roads.

SUMMARY

According to a non-limiting embodiment, a system includes at least one sensor and a controller in signal communication with the sensor. The at least one sensor is configured to output at least one signal indicating water on a road on which at least one vehicle travels and vehicle-generated data resulting from operation of the at least one vehicle. The controller is configured to receive the signal and is configured to generate situational data based on the vehicle-generated data, generate a simulated aquaplaning event corresponding to the at least one vehicle based on one or both of the vehicle-generate data and the situational data, and control the at least one vehicle based on the simulated aquaplaning event.

According to another non-limiting embodiment, a computer-implemented method comprises detecting water on a road on which at least one vehicle travels, obtaining vehicle-generated data based on the water and operation of the at least one vehicle, and generating situational data based on the vehicle-generated data. The method further comprises generating a simulated aquaplaning event corresponding to the at least one vehicle based on one or both of the vehicle-generate data and the situational data, and controlling the at least one vehicle based on the simulated aquaplaning event.

According to another non-limiting embodiment, a computer program product to control an electronic device to perform proactive vehicle aquaplaning mitigation, the computer program product comprising a computer readable storage medium having program instructions embodied therewith, the program instructions executable by an electronic computer processor to control the electronic device to perform operations comprising: detecting water on a road on which at least one vehicle travels, obtaining vehicle-generated data based on the water and operation of the at least one vehicle, and generating situational data based on the vehicle-generated data. The method further comprises generating a simulated aquaplaning event corresponding to the at least one vehicle based on one or both of the vehicle-generate data and the situational data, and controlling the at least one vehicle based on the simulated aquaplaning event.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
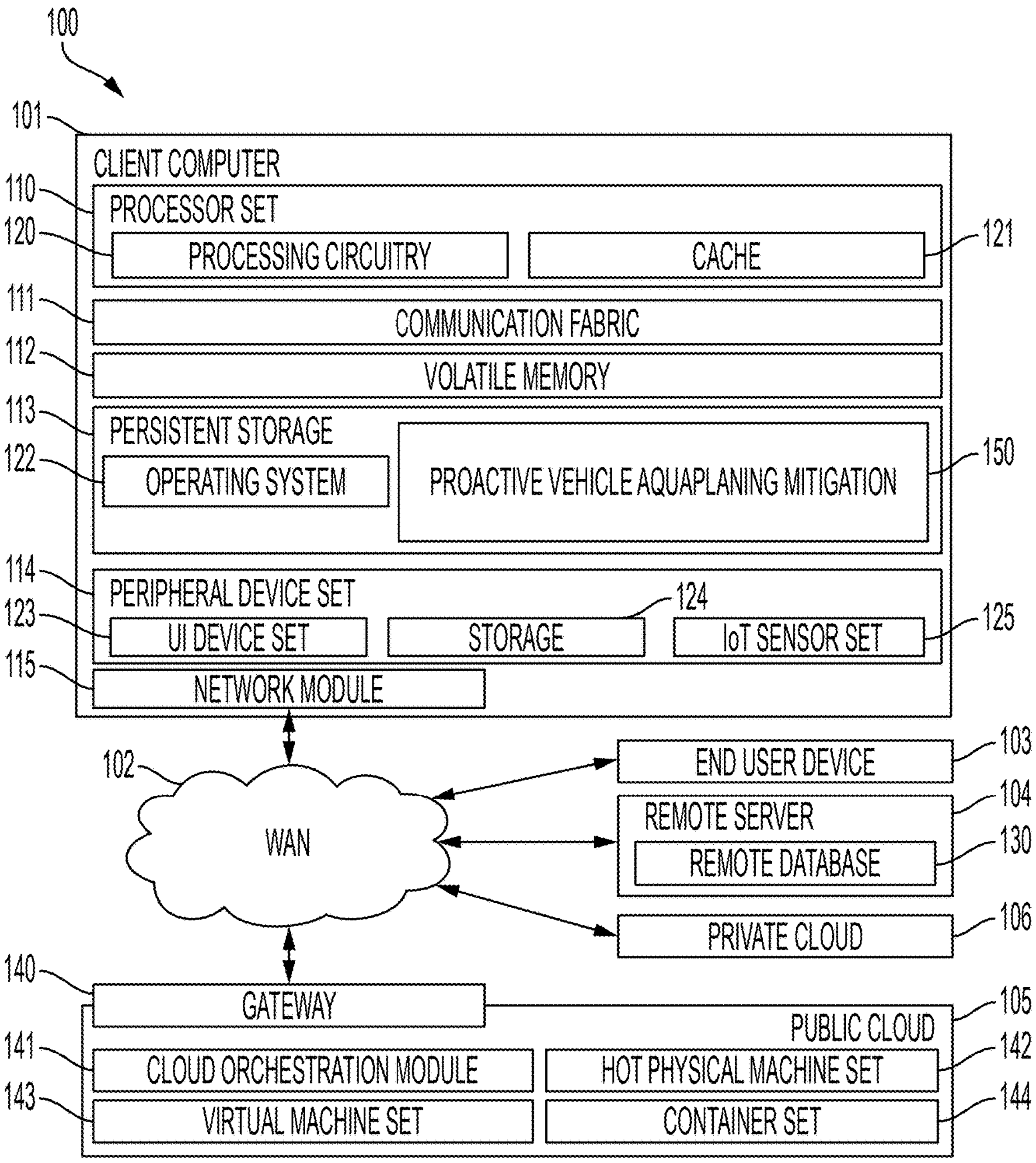
FIG. 1 depicts a block diagram of an example computer system for use in conjunction with one or more embodiments of the present invention.

Aquaplaning is caused when water located between the tire and the road cannot be properly displaced by the tire tread. The force of the car pushes the water straight under the wheels, causing the tires to lose traction with the road surface. Aquaplaning typically lasts for a few seconds and the wheels will gain traction again before you've even had time to react. In some instances where the vehicle through a standing water at high speed and/or when the road is saturated with water, all four wheels might lose traction for a few hundred meters, thereby causing a dangerous driving condition and a frightening experience.

The risk of aquaplaning is typically impacted by two factors: speed and wheel condition. Speed has the biggest effect because the faster you're travelling the less water displacement the tires can handle. However, the condition of the tires can have also have a significant impact regarding the frequency and/or severity of aquaplaning events. In any case, aquaplaning may pose a serious threat to road safety, leading to accidents due to loss of traction caused by water accumulation between tires and the road.

Existing challenges include unpredictable aquaplaning occurrences influenced by speed, tire conditions, and road factors. For example, aquaplaning is more likely to occur at higher speeds. Therefore, vehicle speed is a key factor because as the speed of the vehicle increases, the tires may be less effective at pushing water out from under them, leading to a loss of contact with the road. Tire characteristics are also a factor that contributed to aquaplaning events. For example, worn-down tires (sometimes referred to as "bald tires") are more prone to aquaplaning as they have less tread depth to channel water away from the tire-road contact area. Tire pressure is a contributing factor because underinflated tires can increase the risk of aquaplaning, while properly inflated tires help maintain the integrity of the tire's footprint and improve the ability to displace water. The road surface conditions and road depth are also factors to monitor. For example, potholes, ruts, or other irregularities in the road may trap water, while road slope can affect how road water is expelled from the road. The depth of the water layer on the road surface is an important factor, especially if the tires are unable to disperse the water effectively. In addition vehicle weight is a contributing factor because heavier vehicles exert more force on the tires, helping to displace water and maintain better traction. Lighter vehicles, however, are more susceptible to aquaplaning. Driving behavior also contributes to vehicle behavior during an aquaplaning event. For example, abrupt steering and/or braking maneuvers can increase the risk of aquaplaning and/or decrease the control of the vehicle during an ongoing aquaplaning event. With these factors in mind, there is need to proactively mitigate aquaplaning risks, considering real-time conditions, and employing simulations to determine safe vehicle speeds, issue alerts, and optimize driving behavior for both manual and autonomous vehicles.

Various non-limiting embodiments of the present disclosure provide a vehicle aquaplaning mitigation system configured to perform proactive vehicle aquaplaning mitigation including real-time simulation, speed control, and guidance for enhanced vehicle safety. In one or more non-limiting embodiments, the vehicle aquaplaning mitigation system is capable of performing proactive simulations to prevent aquaplaning on wet roads. The proactive vehicle aquaplaning mitigation system includes an aquaplaning mitigation controller configured to analyze data such as speed, tread depth, and/or occupant behavior, simulate driving actions to determine a safe speed and/or steering directions to overcome and/or avoid an aquaplaning event. In scenarios involving a group of vehicles, the proactive vehicle aquaplaning mitigation system can improve surrounding conditions by simulating possible aquaplaning events, coordinating minimum vehicle speeds, and communicating with surrounding vehicles to optimize traffic flow. In one or more non-limiting embodiments, the proactive vehicle aquaplaning mitigation system can communicate with water depth measurement devices installed on the vehicle and dynamically adjust speeds using vehicle-to-everything (V2X) communication to predict aquaplaning hazards, and generate augmented reality alerts and/or directions for steering the vehicle to overcome or avoid an aquaplaning event. The system can also analyzes wet road curvature, and autonomously control vehicle steering and/or speed to mitigate and/or overcome aquaplaning events.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as performing proactive vehicle aquaplaning mitigation including real-time simulation, speed control, and guidance for enhanced vehicle safety. In addition to the system configured to perform proactive vehicle aquaplaning mitigation including real-time simulation, speed control, and guidance for enhanced vehicle safety 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and a system to perform proactive vehicle aquaplaning mitigation including real-time simulation, speed control, and guidance for enhanced vehicle safety 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods such as performing proactive vehicle aquaplaning mitigation including real-time simulation, speed control, and guidance for enhanced vehicle safety 150, for example, may be stored in the in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code facilitate the system and method of performing proactive vehicle aquaplaning mitigation including real-time simulation, speed control, and guidance for enhanced vehicle safety 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
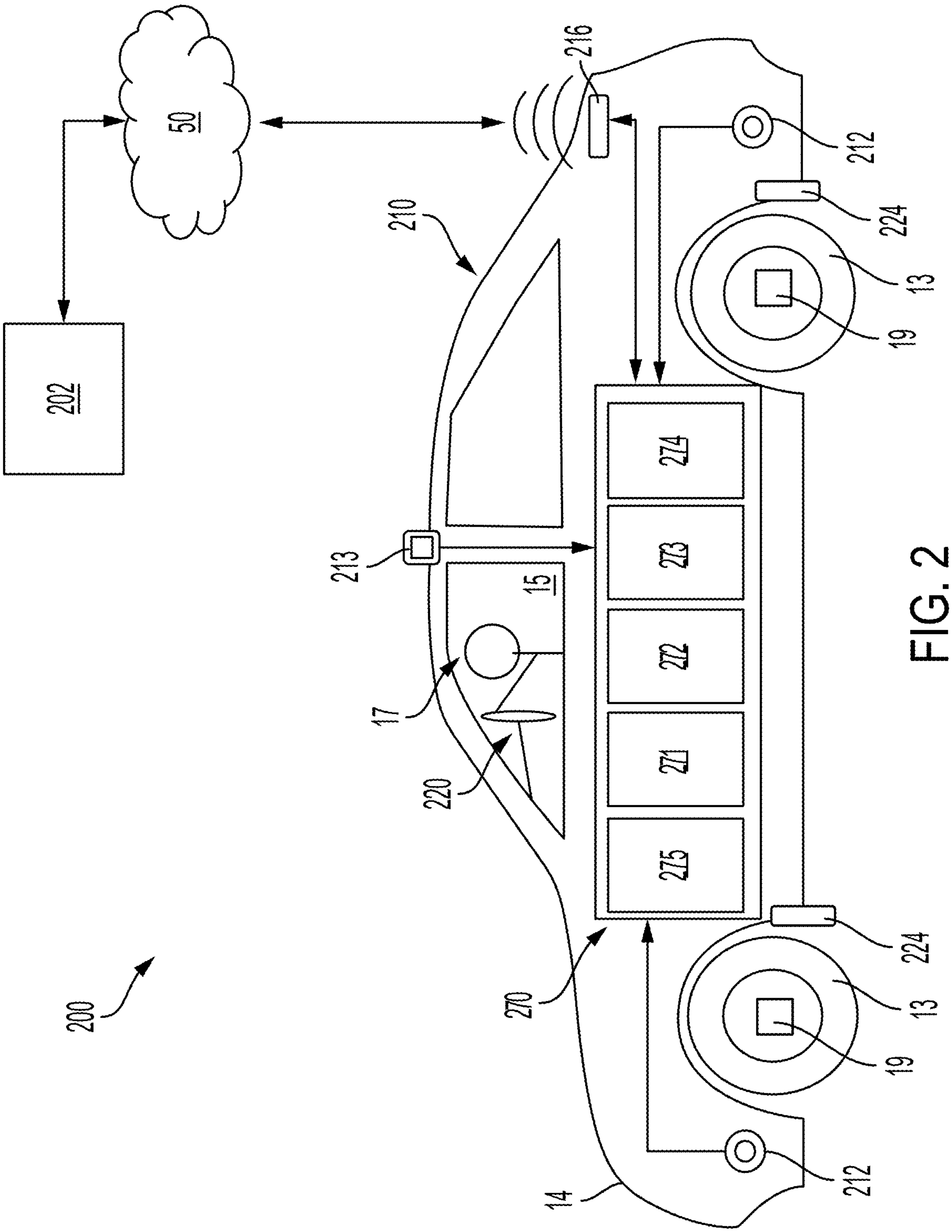
FIG. 2 depicts a vehicle included in a proactive vehicle aquaplaning mitigation system in accordance with one or more embodiments of the present invention.

With reference to FIG. 2, a vehicle 210 is illustrated according to a non-limiting embodiment. The vehicle 210 can be operated by an occupant 17 and/or can be operated autonomously. The vehicle 210 includes a body 14 that defines a cabin 15 to accommodate an occupant 17, who may or may not be required for vehicle operations. The vehicle 210 also includes a powertrain system 275, a steering system 220, and a global position system/navigation (GPS/NAV) system 274. The powertrain system 275 generates power and delivers it to the road surface. The powertrain system 275 includes an engine, transmission, driveshafts, differentials, and the wheels 13 (also referred to herein as tires 13). The steering system 220 is responsible for controlling the direction of a vehicle 210. The steering system 220 can include a steer-by-wire system, which converts a directional input (e.g., an electrical signal indicating a rotational input of a steering wheel provided by the occupant 17 and/or autonomously from a controller) into the directional adjustment of the vehicle's wheels 13. The vehicle 210 also include a braking system including brakes 19 and air jets 224 coupled to each wheel 13. The braking system can include a brake-by-wire system, which converts a braking input (e.g., an electrical signal indicating a braking input of a brake pedal provided by the occupant 17 and/or autonomously from a controller) into a braking pressure command for applying the brakes 19 to vehicle's wheels 13. Each air jet 224 can be attached with the at the vehicle body 14, chassis, etc., and can output air pressure or an "air jet stream" so that water surrounding the wheel 13 can be dispersed.

The vehicle 210 further includes a vehicle control system 270, which can control the powertrain system 275 and the steering system 220. The vehicle control system 270 includes a vehicle processing unit 271, a memory unit 272, and an input/output (I/O) unit 273. Among other functions, the I/O unit 273 controls the flow of data between the vehicle processing unit (e.g., processor set 110), and at least one sensor 212 that monitors current road and environmental conditions, and/or the GPS/NAV system 274. The I/O unit 273 can also exchange data between the vehicle control system 270.

The powertrain system 275 and the steering system 220 can be electronically controlled to facilitate autonomous vehicle operation based on instructions and commands issued by the vehicle processing unit 271 and/or an aquaplaning mitigation controller 202. In an exemplary case, the GPS/NAV system 274 can continuously determine the current location or position of the vehicle 210 in real-time. The location of the vehicle 210 not only includes the current geographical location of the vehicle 210, but also the current position of the vehicle 210 with respect to the road. For example, when driving on a multi-lane road, the GPS/NAV system 274 can determine the current driving lane of the vehicle 210, along with the location of the other driving lanes surrounding the vehicle 210.

The sensors 212 can sense a speed of the vehicle 210 as well as road conditions and output a signal indicative of sensing results to the vehicle processing unit 271 via the I/O unit 273. For example, at least one sensor 212 can output at least one signal indicating water on a road on which at least one vehicle travels and vehicle-generated data resulting from operation of the at least one vehicle. The sensors 212 can also sense surround objects and the distance between one or more objects and the vehicle 210. The sensors 212 can be implemented as ultrasonic sensors, sonar sensors, infrared (IR) sensors, capacitive sensors, image sensors, optical sensors, and/or a Light Detection and Ranging (LiDAR) sensors. The sensors 212 can also include one or more cameras 213. The camera 213 can capture images surrounding the vehicle 210 and output the captured images to the vehicle control system 270. In at least one non-limiting embodiment, the vehicle processing unit 271 can perform various image recognition operations that detect the profile of the road, along with other surrounding vehicles included in the image provided by the camera 213.

The vehicle processing unit 271 can issue acceleration, target speed and/or steering instructions to the powertrain system 275 and/or steering system 220, respectively, based on the GPS data, the sensing results and/or the image data. Based on the acceleration and steering instructions, the steering system 220 and the powertrain system 275 can control the steering of the wheels 13 and the output of the engine, respectively. In this manner, the vehicle control system 270 can autonomously operate the vehicle 210.

The memory unit 272 can store various driving rule sets, along with executable instructions that are readable and executable by the vehicle processing unit 110. When the executable instructions are read and executed by the vehicle processing unit 110, the executable instructions can cause the vehicle processing unit 271 to autonomously control various operations of the vehicle 210 based on the sensing results indicated by the output signal(s) provided by the sensors 212 in an autonomous control mode or to control the various operations based on the sensing results provided by the sensors 212 and based on operator commands in a non- or semi-autonomous control mode.

The vehicle 210 further includes a wireless communication system 216. The wireless communication system 216 can wirelessly exchange data between other communication devices. The communication devices can include wireless nodes installed on objects surrounding the vehicle 210 and/or other surrounding vehicles that also include a wireless communication system. Accordingly, the vehicle 210 can exchange data with one or more surrounding vehicles, and the vehicle control system 270 can operate the vehicle 210 based on the exchanged data. For example, the vehicle control system 270 can adjust the position of the vehicle 210 based data exchanged with one or more surrounding vehicles. In addition, the vehicle 210 can output data to the surrounding vehicles and request that they adjust their position with respect the vehicle 210 as described in greater detail below.

The wireless communication system 216 can also exchange data with a communication network 50. The communication network can include a cloud computing environment (e.g., public cloud 105 and/or private cloud 106), which facilitates data exchange between the vehicle 210 and various devices such as a an aquaplaning mitigation controller 202, for example. The aquaplaning mitigation controller 202 can include a controller and memory. The aquaplaning mitigation controller 202 can analyze data in the memory along with data provided by the vehicle 210, and output driving commands to control the vehicle 210 (e.g., the powertrain system 275 and/or the steering system 220) based on the analysis.

The aquaplaning mitigation controller 202 can support an autonomous vehicle ecosystem capable of predicting if one or more vehicles surrounding the vehicle 210. The autonomous vehicle ecosystem can exchange driving commands between the vehicle 210 and other surrounding vehicles via the communication system 216. Based on the driving commands, the vehicle 210 and/or other surrounding vehicles can be dynamically controlled.

Figure 3:
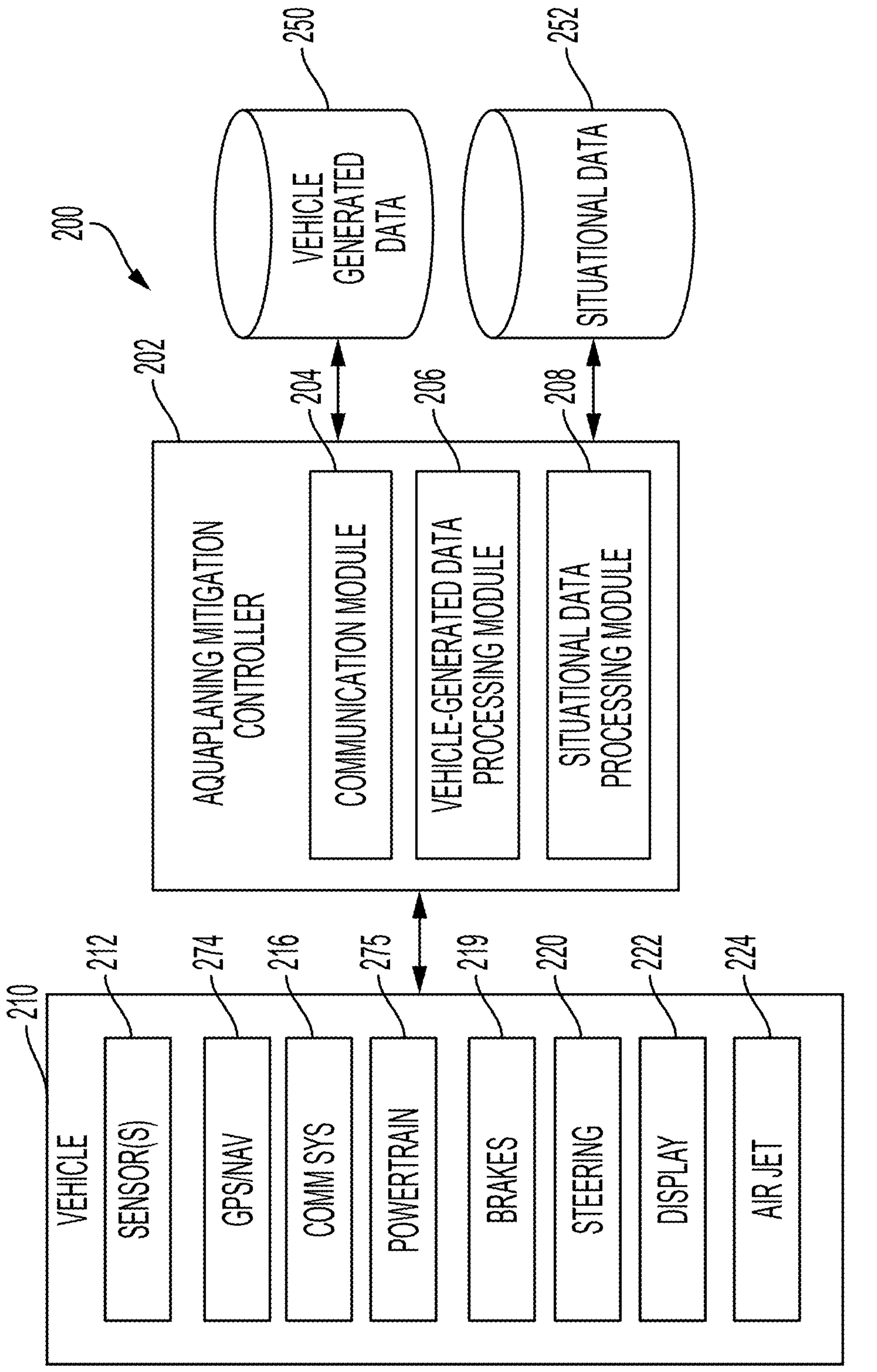
FIG. 3 depicts a block diagram of a proactive vehicle aquaplaning mitigation system in accordance with one or more embodiments of the present invention.

Referring now to FIG. 3, a proactive vehicle aquaplaning mitigation system 200 in accordance with one or more embodiments of the present invention is shown. In exemplary embodiments, the proactive vehicle aquaplaning mitigation system 200 includes an aquaplaning mitigation controller 202 that may be embodied in a computer 101, such as the one shown in FIG. 1, and located locally in a vehicle 210 and/or remotely from the vehicle 210 (e.g., in remote server 104). The aquaplaning mitigation controller 202 can also be implemented in a cloud-based server of a cloud-based network system (e.g., public cloud 105 and/or private cloud 106).

As illustrated, the proactive vehicle aquaplaning mitigation system 200 includes a aquaplaning mitigation controller 202 that is associated with one or more vehicles 210. The aquaplaning mitigation controller 202 is configured to receive and process vehicle-generated data 250 from one or more vehicles 210, generate and manage situational data 252. The aquaplaning mitigation controller 202 includes a communication module 204, a vehicle-generated data processing module 206, and a situational data processing module 208. The aquaplaning mitigation controller 202 is associated with one or more vehicles 210 and is in signal communication with one or more of the sub-systems (e.g., 212, 216, 219, 220, 222, 224, 274 and 275) of the vehicle 210. The aquaplaning mitigation controller 202 processes and/or stores data, such as situational data 252 and vehicle-generated data 250, in or associated with a hybrid cloud system.

The vehicle-generated data 250 includes, but is not limited to, vehicle speed, tire characteristic data (e.g., tire pressure, tread depth, tire width), road water depth, road water density, road surface condition, road profile (e.g., slope of the road, direction of the road, curvature of the road, surface characteristics, etc.), vehicle location (e.g., lane position), vehicle weight, steering input data, and braking input data, occupant driving behavior, current weather conditions (e.g., temperature, surrounding wind conditions, precipitation amount, etc.) surrounding vehicles and traffic flow data, and surrounding road/terrain data.

The communication module 204 of the aquaplaning mitigation controller 202 communicates with one or more devices, such as the various sub-systems of the vehicle 210. The communication module 204 exchanges data between the vehicle 210 and the aquaplaning mitigation controller 202. The data includes the vehicle-generated data 250, data provided by the sensors 212, and/or situational data 252. The aquaplaning mitigation controller 202 can store the vehicle-generated data 250 and the situational data 252 in respective storage units, and/or obtain the stored data therefrom. In some embodiments, the storage devices storing the vehicle-generated data 250 and the situational data 252 are associated with a hybrid cloud system.

The vehicle-generated data 250 includes data produced in response to operating the vehicle 210 including, but not limited to, speed, acceleration, brake pressure, steering inputs, vehicle position, lane location, weather data, tire pressure, tire tread state, detected water on the road, data associated with the water on the road, etc. The sensor data can include the vehicle-generated data 250, along with image data, spatial data, and/or energy data provided by the image sensors 212 and/or camera 213. The situational data 252 includes historically learned data, learned data generated by one or more machine learning techniques, training data, predicted data, simulated/virtually generated data, augmented reality (AR) data, and/or artificial intelligence (AI) produced data generated by one or more AI algorithms.

In some embodiments, the aquaplaning mitigation controller 202 identifies surrounding vehicles 210, such as vehicles that are entering an identified geographic location and generates requests for data for the identified vehicles 210. In some embodiments, the communication module 204 receives vehicle-generated data 250 from one or more surrounding vehicles at periodic intervals and/or as the vehicle 210 is actively operating in real-time.

The aquaplaning mitigation controller 202 can utilize the communication module 204 to generate one or more requests for data using the parameters and transmit the requests for data to one or more vehicles 210. The communication module 204 receives vehicle-generated data 250 from the vehicle(s) 210 responsive to the requests and communicates the vehicle-generated data 250 to the vehicle-generated data processing module 206.

The vehicle-generated data processing module 206 processes the vehicle-generated data 250 and/or uses the received vehicle generated data to calculate and/or estimate additional real-time vehicle data. In some embodiments, the vehicle-generated data processing module 206 extracts the data obtained from the signal(s) output from the sensors 212 of the vehicle 210 and the corresponding geographic location of the vehicle 210 provided by the GPS/NAV system 274 at the time the data from the sensor 212 was obtained and the system time of the vehicle 210 when the data from the sensor 212 was obtained. In some embodiments, the data from one or more of the sensors 212 (including a camera) is analyzed for content, associated with one or more categorization tags, and formatted for further analysis and/or processing.

The situational data processing module 208 can use the processed vehicle-generated data 250 and/or data from one or more of the sensors 212 (including a camera) to generate the situational data 252. According to a non-limiting embodiment, the situational data processing module 208 generates the situational data 252 by applying one or more simulation models, machine learning techniques, AI algorithms, and/or AR processes to the vehicle-generated data 250 and/or sensor data. In some embodiments, the situational data 252 is generated using data from multiple devices and/or multiple vehicles 210, data from devices or vehicles 210 in an identified geographic area, and/or data collected over a predetermined interval of time. The situational data can then be provided to the vehicle 210 to guide an occupant operating the vehicle 210 and/or autonomously control the vehicle 210 to resolve an ongoing aquaplaning event and/or avoid an aquaplaning event altogether.

Figure 4:
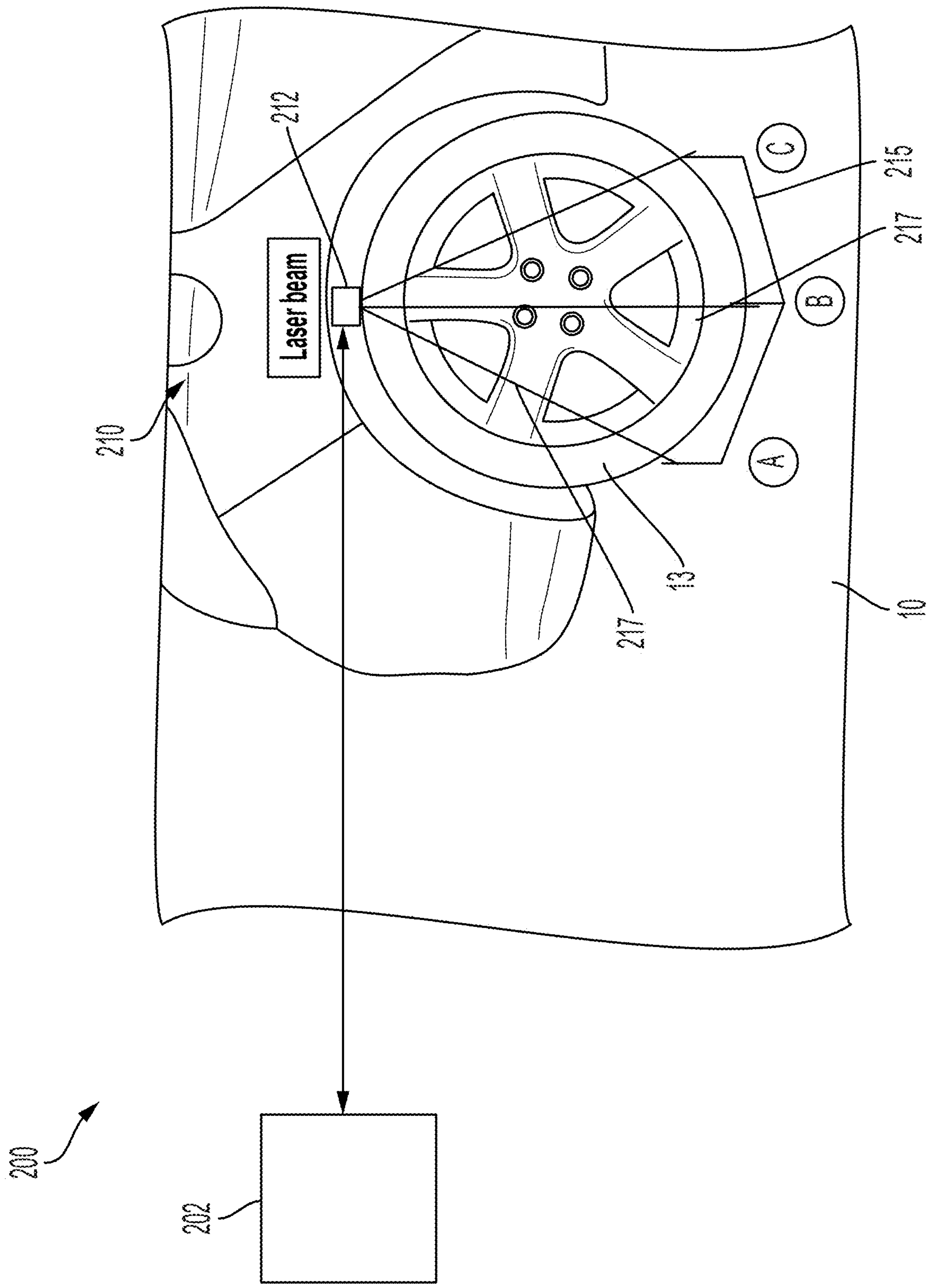
FIG. 4 depicts a process performed by the proactive vehicle aquaplaning mitigation system to measure a depth of water surrounding a wheel of a vehicle according to a non-limiting embodiment of the present invention.

Referring now to FIG. 4, the proactive vehicle aquaplaning mitigation system 200 is illustrated measuring a depth of water surrounding a wheel 13 of a vehicle 210 according to a non-limiting embodiment of the present invention. A sensor 212 such as laser sensor or sonar sensor, for example, monitors a portion of the road 10 in contact with a vehicle wheel 13, which appear in a sensor field of view (FOV) 215. The sensor 212 (e.g., a LiDAR sensor) can emit one or more laser beams 217 to three different points (A, B and C) of the road 10 and a detect the reflected energy that is reflected from the surface of the road 10.

The reflected energy will have a different energy intensity based on the condition of the road. For instance, a road surface absent water will reflect energy having a greater intensity compared to a road surface containing water. Further, the energy intensity reflected by water existing on the road surface will decrease as the depth of the water increases. In a non-limiting embodiment, the reflected energy from the three points of the road (A, B and C) are averaged. In this manner, the aquaplaning mitigation controller 202 can utilize the reflected energy signal (e.g., vehicle generated data) to determine the depth of the water existing on the portion of the road 10 appearing in the FOV 215.

According to a non-limiting embodiment, the water build-up between the wheels/tires 13 and the surface of the road 10 leads to a loss of traction. According to a non-limiting embodiment, the weight of the vehicle 210 balances the lift force ($F_{lift}$). Accordingly, a heaver vehicle 210 will have better traction during road water conditions compared to a lighter vehicle 210. The loss of traction experienced by a vehicle 210 can be defined as a lift force ($F_{lift}$) using the following hydrodynamic lift equation, which also can be used to simulate an aquaplaning effect on a given wheel 13. The hydrodynamic lift equation can be defined as follows:

$$F_{lift} = 1/2 \cdot C_{lift} \cdot \rho \cdot A \cdot V2,$$

where:

$F_{lift}$ is the lift force;

$C_{lift}$ is the lift coefficient;

ρ is the density of water;

A is the effective area of the tire in contact with the water; and

V is the velocity of the vehicle

Figure 5:
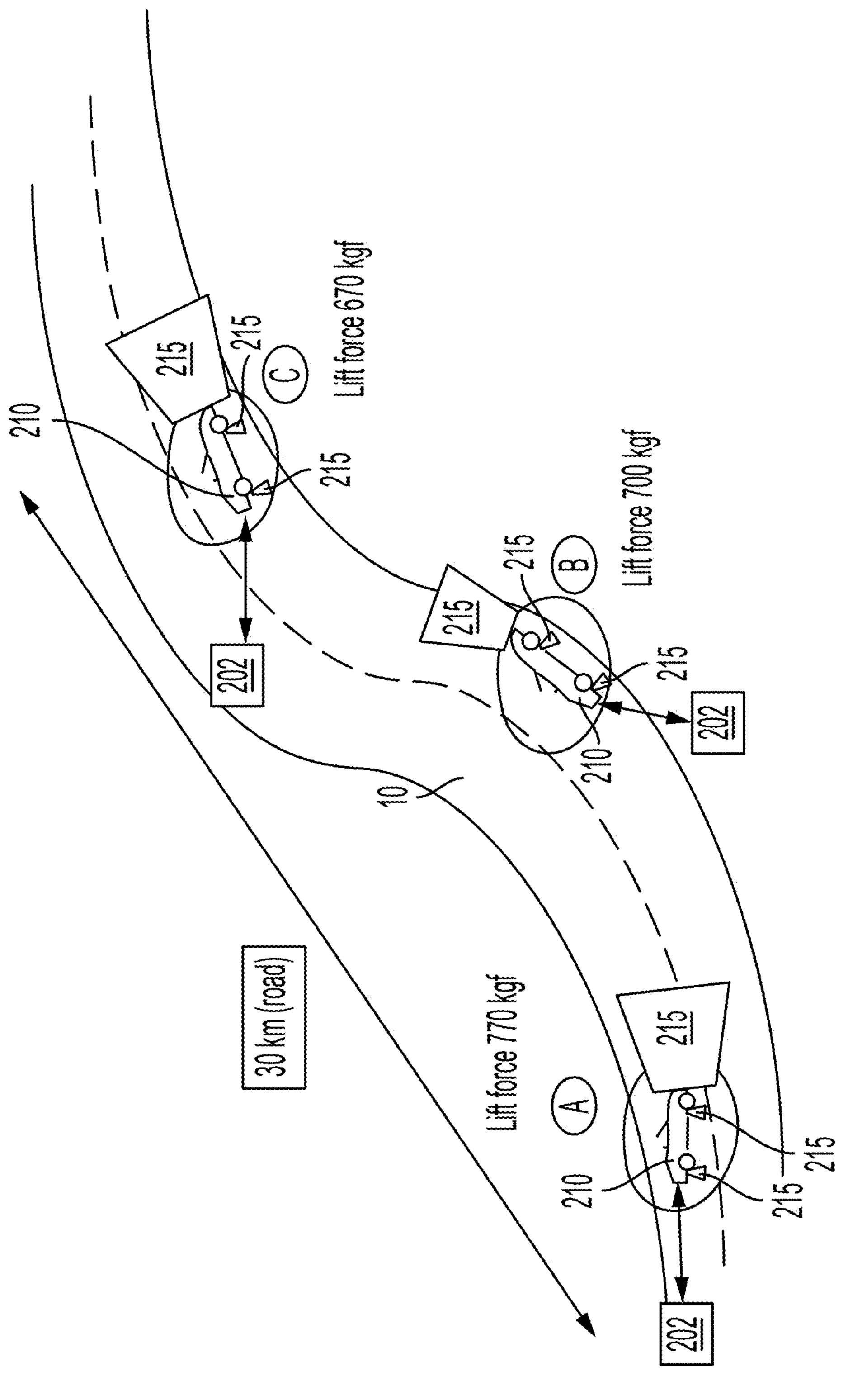
FIG. 5 depicts a process performed by the proactive vehicle aquaplaning mitigation system to calculate different lift forces at different portions of a wet road according to a non-limiting embodiment of the present invention.

Turning to FIG. 5, a process performed by the proactive vehicle aquaplaning mitigation system 200 to calculate different lift forces at different portions of a wet road 10. According to a non-limiting embodiment, the aquaplaning mitigation controller 202 can utilize V2X data exchange to identify road profiles, road conditions and/or amounts of water accumulated on the road 10 in real-time to actively assess aquaplaning risks in real-time. The assessments can be performed periodically and/or constantly during the operation of the vehicle 210.

As shown in FIG. 5, the road 10 includes changing road profile (e.g., elevations and/or turns) at points A, B and C of the road 10. The vehicle 210 traverses the road 10, water depth between the vehicle wheels and the road 10, along with while the changing profile of the road appearing in the FOV of the vehicle sensors can be identified by the aquaplaning mitigation controller 202. The aquaplaning mitigation controller 202 can not only determine an ongoing aquaplaning event or imminent aquaplaning event by calculating the lift force (Flift) at point A of the road 10, but can also simulate and predict future expected aquaplaning events by calculating Flift based on the water depth and road profile at points B and C.

Figure 6:
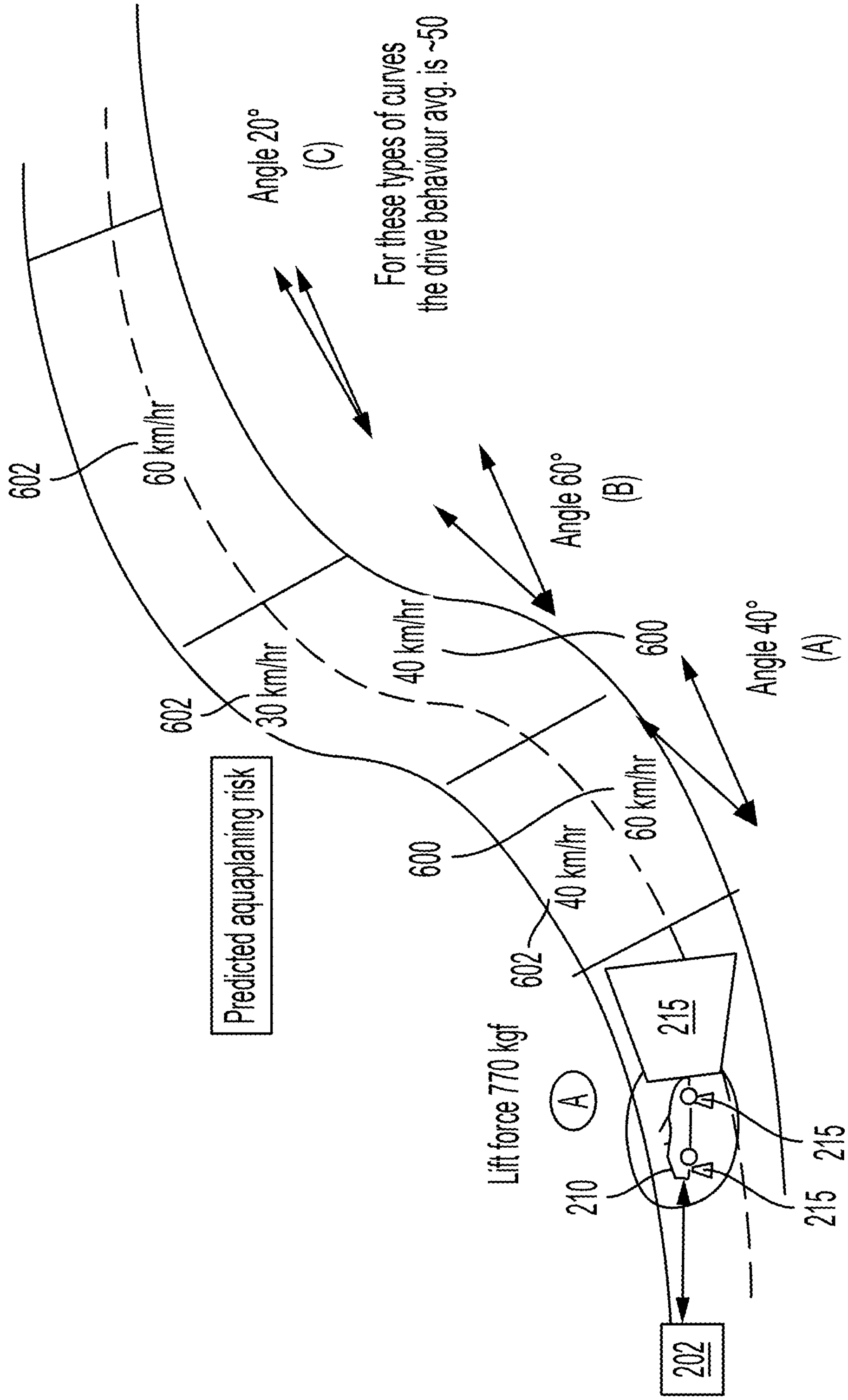
FIG. 6 depicts a process performed by the proactive vehicle aquaplaning mitigation system to calculate a permitted speed of a vehicle operating on a wet road to mitigate an aquaplaning event according to a non-limiting embodiment of the present invention.

Referring to FIG. 6, a process performed by the proactive vehicle aquaplaning mitigation system 200 to calculate a permitted speed of a vehicle operating on a wet road to mitigate an aquaplaning event according to a non-limiting embodiment of the present invention. According to a non-limiting embodiment, the aquaplaning mitigation controller 202 is configured to determine the maximum permissible speed of the vehicle 210 on a wet road 10. The mitigation controller 202 can simulate aquaplaning events by taking into account the hydrodynamic lift forces, road surface conditions, and tire characteristics. By integrating a predetermined factor of safety into these simulations, the proactive vehicle aquaplaning mitigation system 200 can dynamically adjust the allowed vehicle speed, ensuring that the vehicle 210 operates within safe speed limits that mitigate, or completely avoid, encountering aquaplaning events under varying wet road conditions. The calculated allowed vehicle speed is crucial in mitigating the risk of aquaplaning, as it directly correlates with the vehicle's ability to maintain traction and stability when driving on a wet road 10.

In one or more embodiments, the proactive aquaplaning mitigation system 200 integrates V2X communication and advanced simulation techniques to manage the vehicle's steering system 220 in wet road conditions. For example, vehicle sensors 212 can capture the profile of the road 10 and water conditions appearing in the sensors FOV 215 and deliver the captured images to the aquaplaning mitigation controller 202. The vehicle-generated data processing module 206 and/or the situation data processing module 208 can analyze the image data to determine the profile of the road (e.g., the curvature, elevation, surface type, etc.), along with the depth of water on the road 10 to determine the optimal steering wheel rotation needed to avoid aquaplaning. The aquaplaning mitigation controller 202 can then exchange data with the vehicle 210 to guide the occupant 17 on how to operate the vehicle and/or command the vehicle control system 270 to autonomous control the vehicle 210 by modulating the steering, speed, and/or braking of the vehicle 210 to maintain stability. This proactive approach ensures that the vehicle 210 can navigate through complex road conditions safely, reducing the risk of aquaplaning through precise, real-time adjustments.

According to a non-limiting embodiment, when the aquaplaning mitigation controller 202 determines a maximum safe speed for a given road condition, it communicates this information to the vehicle's control system 211. The vehicle control system 270 can then alert the occupant 17 to potential aquaplaning risks and provide recommendations or commands regarding the safe speed. This communication may take the form of visual and/or auditory warnings, e.g., via the vehicle display unit 222. In this manner, the occupant 17 can be informed of the aquaplaning conditions and risks in real-time.

As described herein, the proactive aquaplaning mitigation system 200 can work with the vehicle control system 270 to perform autonomous control of the vehicle 210, including vehicle speed, steering, and/or braking. By interfacing with the vehicle's powertrain system 275, for example, the aquaplaning mitigation controller 202 can autonomously regulate vehicle speed to ensure the vehicle 210 remains within the calculated safe limits. This feature can be advantageous in situations where the occupant 17 may not react quickly enough to changing road conditions. The autonomous vehicle control also ensures that the vehicle 210 maintains optimal traction and stability, effectively reducing the likelihood of encountering an aquaplaning event.

According to a non-limiting embodiment, the aquaplaning mitigation controller 202 is configured to continuously learn from historical driving patterns, driving behavior, and real-time data inputs included in the vehicle generated data 250. Utilizing advanced machine learning techniques and AI, for example, the aquaplaning mitigation controller 202 can evaluate various factors such as tire wear, tread depth, and road groove patterns. This continuous learning process allows the aquaplaning mitigation controller 202 to refine its calculations of the maximum allowed speed, improving accuracy over time. By leveraging historical data, the aquaplaning mitigation controller 202 can predict and mitigate aquaplaning risks more effectively, tailoring the vehicle's speed adjustments to both current conditions and learned patterns from past experiences.

With continued reference to FIG. 6, for example, the proactive aquaplaning mitigation system 200 can monitor real-time road conditions (e.g., amount of road water) and/or road profiles (e.g., changing road elevations of 40 degrees, 60 degrees 20 degrees, etc.) appearing in the FOV 215 of the sensors 212. Based on learned historical data, the aquaplaning mitigation controller 202 is aware of the occupant's driving behavior and typically speed when encountering similar road profiles. In a non-limiting embodiment, the aquaplaning mitigation controller 202 can calculate a hazardous speed 600 likely to induce an aquaplaning event at a particular portion of the road (e.g., 60 km/hr at 40 degrees elevation (A), 40 km/hr at 60 degrees elevation (B)) and calculate a maximum allowable speed 602 (e.g., 40 km/hr at 40 degrees elevation (A), 30 km/hr at 60 degrees elevation (B), 60 km/hr at 20 degrees elevation (C)) at which the vehicle 210 may avoid the aquaplaning event at the particular portion of the road. The allowable maximum speeds 602 can then be communicated to the occupant 17 (e.g., the vehicle display unit 222) when encountering various portions of the road 10 so that the occupant 17 can adjust the vehicle's speed accordingly and avoid or mitigate an aquaplaning event.

In one or more non-limiting embodiment, the proactive aquaplaning mitigation system 200 operates adaptively to continuously adjust the vehicle's driving parameters based on real-time road conditions. For example, the aquaplaning mitigation controller 202 constantly monitors environmental data such as rainfall intensity, road surface conditions, and traffic dynamics. The vehicle-generated processing module can process this data and pass it to the situational data processing module 208, which then uses this information to optimize control algorithms and generate situational data 252, which can be used to guide the occupant 17 and/or autonomously control the vehicle 210. For example, the occupant 17 and/or the vehicle control system 270 can utilize the situational data 252 to fine-tune the vehicle's speed, steering, and/or braking to maintain vehicle control and prevent aquaplaning. In this manner, the occupant 17 and/or the vehicle 210 respond appropriately to different aquaplaning scenarios.

As described herein, the aquaplaning mitigation controller 202 can utilize vehicle-generated data 250 to generate situational data 252, including AR data, to assist in guiding an occupant to mitigate and/or avoid aquaplaning events. The generation and delivery of AR data 604 allows for providing real-time, contextually relevant guidance to the vehicle's occupant 17. This AR data 604 is created by synthesizing vehicle-generated data 250 with situational data 252, which includes real-time sensor inputs, predictive models, machine learning and/or AI outputs. Once generated, the AR data 604 is transmitted to the vehicle display unit 222, such as a heads-up-display (HUD) and/or infotainment display, where it is rendered in a user-friendly format. The AR guidance data 604 not only aids the occupant 17 in making informed decisions but also serves as a secondary layer of safety by providing automated control inputs when necessary. For example, if the proactive aquaplaning mitigation system 200 detects that the occupant 17 is not responding to an imminent aquaplaning risk, the aquaplaning mitigation controller 202 and vehicle control system 270 can work together to autonomously adjust the vehicle's speed, steering, braking and/or or lane position to mitigate and/or avoid an aquaplaning event, all while keeping the occupant 17 informed through continuous AR feedback.

As described herein, the ability of the proactive aquaplaning mitigation system 200 to deliver AR-based guidance data 605 can be complemented by its capacity for real-time adjustments and integration with the vehicle's autonomous control systems. As the vehicle 210 encounters varying road conditions, the aquaplaning mitigation controller 202 can dynamically recalculate the optimal driving parameters and either presents these to the occupant 17 and/or directly implement them through autonomous vehicle control via the vehicle control system 270. This ensures that the vehicle 210 consistently operates within safe limits, even in rapidly changing environments. Whether through visual AR data 604 projected on the vehicle display unit 222 or automated interventions, the proactive aquaplaning mitigation system 200 can prevent and/or mitigate aquaplaning events and maintain vehicle stability. In this manner, the overall safety of both the occupant 17 and others on the road can be proactive aquaplaning mitigation system 200 can be enhanced.

Figure 7:
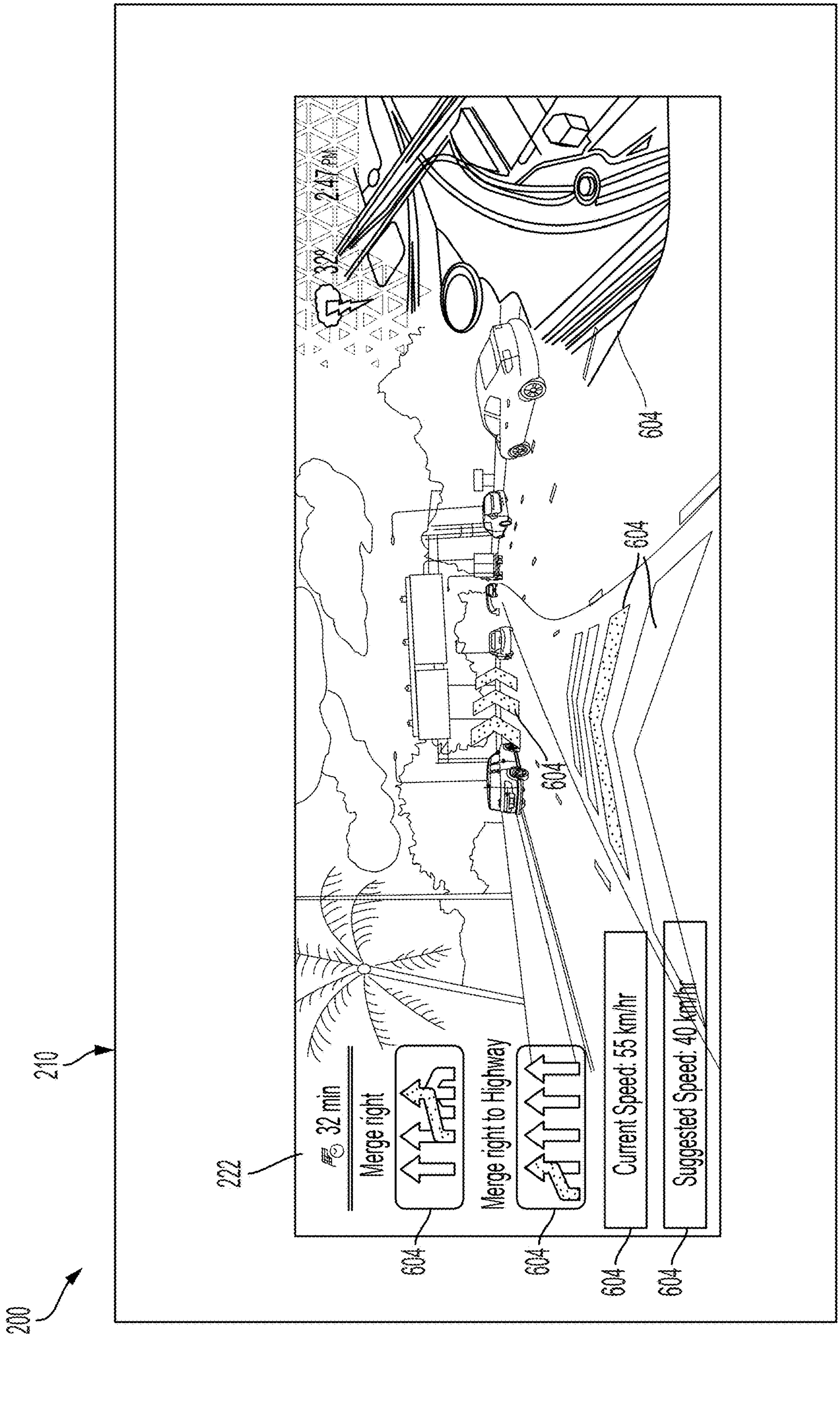
FIG. 7 depicts a display unit of a vehicle displaying AR guidance to mitigate an aquaplaning event according to a non-limiting embodiment of the present invention.

FIG. 7, for example, depicts a vehicle display unit 222 displaying AR guidance data 604 to mitigate an aquaplaning event according to a non-limiting embodiment of the present invention. In a non-limiting embodiment, the proactive aquaplaning mitigation system 200 can utilize V2X communication along with predictive simulations, including ML, AI, and hydrodynamic models to generate Augmented Reality (AR) data 604 designed to guide the occupant 17 in avoiding and/or mitigating aquaplaning events. The AR data 604 encompasses a range of visual and auditory elements, such as graphics, textual instructions, and audio alerts. The AR data 604 can be overlaid or superimposed over real-time road conditions captured by a camera on the vehicle 210 to provide real-time guidance on critical driving parameters like steering wheel rotation angles, vehicle speed, lane positioning, and maintaining safe distances from surrounding vehicles. By projecting overlaying this AR data 604 onto various display interfaces, such as the dashboard, infotainment system, or directly onto the windshield via a heads-up display (HUD), the system enhances the occupant's situational awareness and supports safer driving behaviors during aquaplaning conditions.

According to a non-limiting embodiment, the aquaplaning mitigation controller 202 can incorporate the occupant's historical behavior data into the generation of AR guidance. By analyzing past driving patterns and behaviors, the aquaplaning mitigation controller 202 can create a customized AR strategy tailored specifically to the occupant's driving style and tendencies. This personalized approach ensures that the guidance provided is not only relevant to the current road and weather conditions but also aligns with the occupant's comfort and capabilities. For instance, if an occupant 17 has a history of cautious driving, the AR guidance can emphasize maintaining greater distances from other vehicles and reducing speed more conservatively. Conversely, for a more confident occupant, the guidance can focus on optimizing lane position and steering angles for efficient navigation. This adaptive feature of the proactive aquaplaning mitigation system 200 can enhance both safety and occupant confidence, particularly in high-risk aquaplaning scenarios.

The proactive aquaplaning mitigation system 200 can also utilize detailed map data to assess upcoming road profiles (e.g., curvature, elevation, surface type, etc.) and determine the safest rate of change in steering angle required to navigate turns on a wet road 10. The steering angle and/or directions can then be generated into AR data 604, which is projected on the vehicle display unit 222 to guide the occupant 17. By simulating the vehicle's behavior during turns, the aquaplaning mitigation controller 202 calculates the optimal vehicle angle and corresponding speed limit that should be adhered to, thereby ensuring that the vehicle 210 remains stable and within safe operating conditions. This is particularly critical when the vehicle 210 approaches sharp turns or curves, where the risk of aquaplaning can be heightened due to lateral forces acting on the tires 13. The aquaplaning mitigation controller 202 can continuously adjusts these calculations in real-time, taking into account the current road conditions, vehicle 210 parameters, and/or tire characteristics, and can communicate this information to the occupant 17 through AR-based data 604 and/or by autonomously adjusting the vehicle 210 (e.g., vehicle speed, steering angle and/or braking) with AR data 604 to inform the occupant 17 of the autonomous driving actions.

Figure 8A:
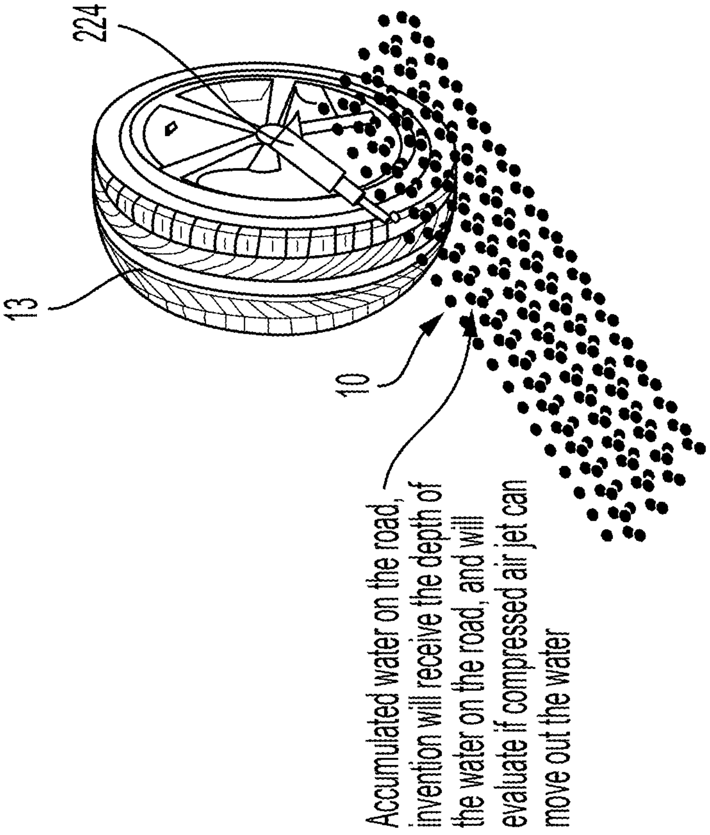
FIGS. 8A and 8B depict an air jet included in the proactive vehicle aquaplaning mitigation system in accordance with one or more embodiments of the present invention.
Figure 8B:
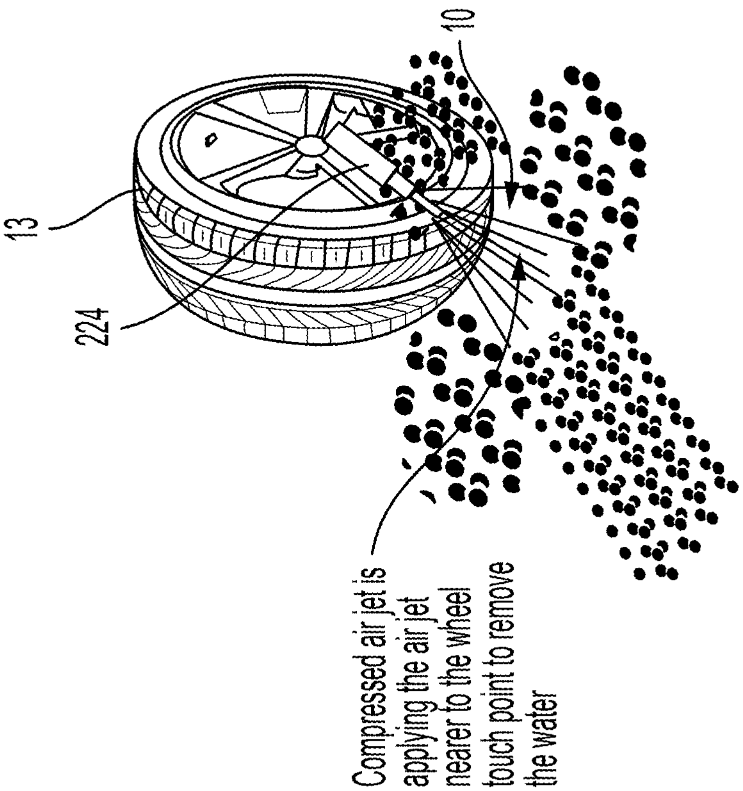

Turning now to FIGS. 8A and 8B, an air jet 224 included in the proactive vehicle aquaplaning mitigation system 200 is illustrated according to a non-limiting embodiment of the present invention. According to a non-limiting embodiment, the aquaplaning mitigation controller 202 is configured to dynamically control the activation of air jets 224 based on vehicle speed and the depth of water on the road 10. By continuously monitoring these variables, the aquaplaning mitigation controller 202 can determine the optimal moment to activate the air jets 224 to effectively disperse water from the area (A) 219 around the vehicle's wheels 13. The aquaplaning mitigation controller 202 can calculate the required air pressure and the flow rate necessary of the air output from a given air jet 224 to achieve a defined maximum height of the water layer, ensuring that the wheels 13 maintain optimal contact with the road 10. This real-time adjustment allows for reducing the risk of aquaplaning by minimizing the water located at the area (A) 219 of the road 10 around the tires 13, thereby enhancing wheel traction.

According to a non-limiting embodiment, the aquaplaning mitigation controller 202 can leverage historical learning, empirical formulas and AI to optimize the performance of the air jets 224. Through continuous machine learning, for example, the aquaplaning mitigation controller 202 can predict the necessary air pressure and flow rate required to disperse water using the air jets 224 based on various conditions such as road surface characteristics, water depth, and vehicle speed. This adaptive capability allows the aquaplaning mitigation controller 202 to fine-tune the force of the air jets 224, ensuring that water is effectively moved away from the critical areas where the tires 13 meet the road 10. The ability of the proactive vehicle aquaplaning mitigation system 200 to adjust the output air pressure from the air jets 224 in real-time based on current conditions significantly enhances the vehicle's stability and reduces the likelihood of hydroplaning.

According to a non-limiting embodiment, the aquaplaning mitigation controller 202 can utilize historical data to calculate the precise amount of air pressure output from an air jet 224 needed to disperse water from the area where the tire 13 meets the road 10. To determine the amount of pressure, the aquaplaning mitigation controller 202 can continuously assess the depth of the water and the speed of the vehicle 210, and then calculate the appropriate air jet output to ensure that the water is effectively cleared from the area (A) 219 of the road 10 that contacts the tire 13. This calculation takes into account the width of the tire and the rate at which the vehicle 210 is moving, ensuring that the water is displaced in a manner that maintains optimal traction. By dispersing the water from the wheel touchpoints, the proactive vehicle aquaplaning mitigation system 200 ensures that the vehicle 210 remains stable, even on wet surfaces.

According to a non-limiting embodiment, the air jets 224 can be installed near the vehicle's wheels 13 (e.g., on the body 14 or the chassis) and designed to deliver a stream of air at a pressure that is sufficient to disperse and clear the water from the area (A) 219 of the road 10 around the tires 13. Accordingly, the located placement of the air jets 224 facilitates targeting of the specific area 219 where water accumulation is most likely to cause a loss of traction. In addition, the ability of the aquaplaning mitigation controller 202 to adjust the speed and pressure of the air jets 224 based on real-time conditions, such as vehicle speed and water depth, ensures that the hydrodynamic lift and potential for aquaplaning are effectively controlled. By actively managing the distribution of air pressure, the proactive vehicle aquaplaning mitigation system 200 can enhance the vehicle's ability to navigate wet roads safely.

According to a non-limiting embodiment, the proactive aquaplaning mitigation system 200 also provides the capability to electrically adjust a position of the air jets 224 based on a variety of factors, including vehicle speed, water depth, and vehicle weight. For example, the aquaplaning mitigation controller 202 can continuously monitor these variables and adjust the air jet output to ensure that the water is removed from target areas (A) around the tires 13. When the vehicle 210 encounters deeper water, the aquaplaning mitigation controller 202 can control one or more of the air jets and increase the air pressure to disperse a greater volume of water, thereby maintaining the tires' grip on the road 10. This dynamic adjustment reduces the possibility of aquaplaning by ensuring that a minimum amount of water collects on the target area at which the tires 13 contact the road 10 to facilitate safe vehicle operation.

In a non-limiting embodiment, the aquaplaning mitigation controller 202 can calculate the volume of water that needs to be displaced from a target area (A) 219 of road 10, taking into account factors such as water depth, vehicle speed, and tire width. The aquaplaning mitigation controller 202 can apply a safety factor, such as multiplying the tire width by a factor greater than one (e.g., 1.1 or 1.2), to ensure that a sufficient amount of water is removed from the target area (A) 219 at which the wheel 13 contacts the road 10. This safety factor can be adjusted based on historical data, for example, to allow the aquaplaning mitigation controller 202 to refine its calculations over time. Based on vehicle generated data 250, the aquaplaning mitigation controller 202 can also determine the vehicle's forward movement and the rate at which the wheels 13 will encounter new water on the road 10 and use this information to ensure that the area in front of the wheels 13 remains clear of water.

According to a non-limiting embodiment, the proactive aquaplaning mitigation system 200 can determine the pressure of output air from one or more of the air jets 224 based on the real-time tire pressure of one or more of the tires 13. For example, the aquaplaning mitigation controller 202 can determine the tire pressure of a given tire 13 when calculating the area (A) 219 of water that needs to be displaced. Lower tire pressure results in a larger contact area between the tire 13 and the road 10, which in turn increases the amount of water that must be removed to prevent aquaplaning. The aquaplaning mitigation controller 202 can adjust its calculations to account for this additional area, ensuring that the air jets 224 disperse enough water to maintain traction. By continuously monitoring and adjusting for tire pressure, the proactive aquaplaning mitigation system 200 enhances the vehicle's stability and reduces the risk of aquaplaning as wheel conditions change over time.

Figure 9B:
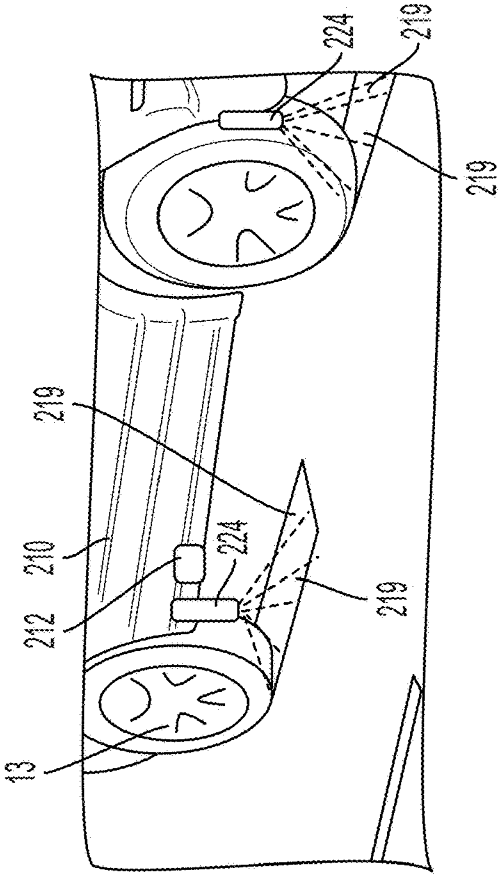
FIGS. 9A and 9B depict a process performed by the proactive vehicle aquaplaning mitigation system to displace water on the road away from the wheels of a vehicle in accordance with one or more embodiments of the present invention.
Figure 9A:
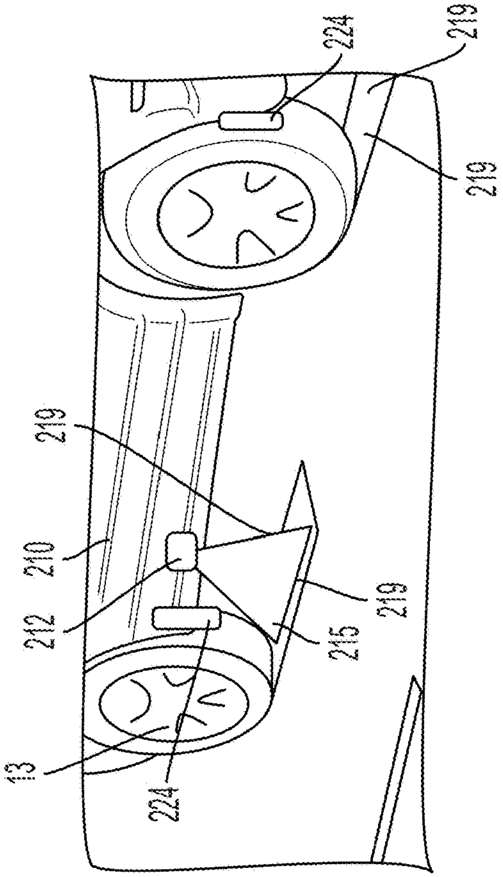

Referring to FIGS. 9A and 9B, the 200 is illustrated performing a process of determining an amount water to be removed from at target area (A) 219 of the road 10 where a vehicle wheel 13 touches a portion of the road surface using an air jet 224. In this non-limiting embodiment, the aquaplaning mitigation controller 202 can calculate the target area (A) 219 of road surface from which water must be removed to ensure optimal tire traction. For example, the aquaplaning mitigation controller 202 can determine the effective width of the tire's contact area, which is adjusted by a safety factor (f1) (e.g., derived from historical data and simulations). The safety factor (f1) accounts for variances in road and tire conditions, ensuring that the width (b) considered is sufficiently broad to maintain safety under various conditions. The aquaplaning mitigation controller 202 can then calculate the length of the road surface from which water needs to be cleared, which is dependent on the vehicle's speed (V) and a second safety factor (f2). The product of these two dimensions, adjusted by their respective safety factors provides the total area (A) 219 of the road surface that must be cleared of water to prevent aquaplaning.

Once the target area (A) 219 is determined, the aquaplaning mitigation controller 202 can calculate the volume of water that needs to be displaced by the air jets 224. This calculation is performed by multiplying the area (A) 219 by the depth of the water (h) on the road 10. The resulting volume (V) is then used to estimate the weight of the water (e.g., mass in terms of gram molecule (gm)) to determine the energy required to remove it. The weight of the water (gm) is calculated using its density (p), typically assumed to be 997 kg/$m^3$ or rounded to 1000 kg/$m^3$ for simplicity. According to a non-limiting embodiment, the weight of the water (gm) can be calculated using the following formula:

$$\text{mass of water (gm)} = h*(A+(f1*b)*(f2*V))*d,$$

where

A is a target area at which road water is to be removed,
h is the depth of the water located in the target area (A)
b is the wheel width, it is depending on vehicle type and model,
V is the velocity of vehicle on the road,
ρ is the density of the water located in the target area (A),
f1 is a first safety factor, and
f2 is a second safety factor This calculation provides the aquaplaning mitigation controller 202 with a precise measurement of the weight (e.g., mass) of water that needs to be displaced from the tire's contact area per unit of time, thereby ensuring that the air jets 224 can be calibrated to deliver an air stream with sufficient pressure and velocity.

According to a non-limiting embodiment, the aquaplaning mitigation controller 202 can utilize additional factors when calculating the weight of the water (gm). For example, the depth of water (h) on the road surface varies with weather conditions and must be continuously monitored. The wheel contact area (A) 219 is another variable that depends on tire pressure, which can change based on the vehicle's load and tire condition. The width of the tire (b) is specific to the vehicle's type and model, while the vehicle's speed (V) influences the length of the road surface that must be cleared of water. Safety factors f1 and f2 are also variable and are refined through continuous learning and simulation. By incorporating data from a camera-based system, the aquaplaning mitigation controller 202 can assess the effectiveness of water removal in real-time and adjust these factors accordingly.

According to a non-limiting embodiment, the aquaplaning mitigation controller 202 can utilize the Bernoulli principle to ensure that the air jets generate sufficient energy to displace the calculated volume of water. The energy of the compressed air flow must be equal to or greater than the weight of the water to be removed. The aquaplaning mitigation controller 202 can simplify this calculation by focusing on the kinetic energy of the air stream, neglecting pressure and potential energy components.

Figure 10B:
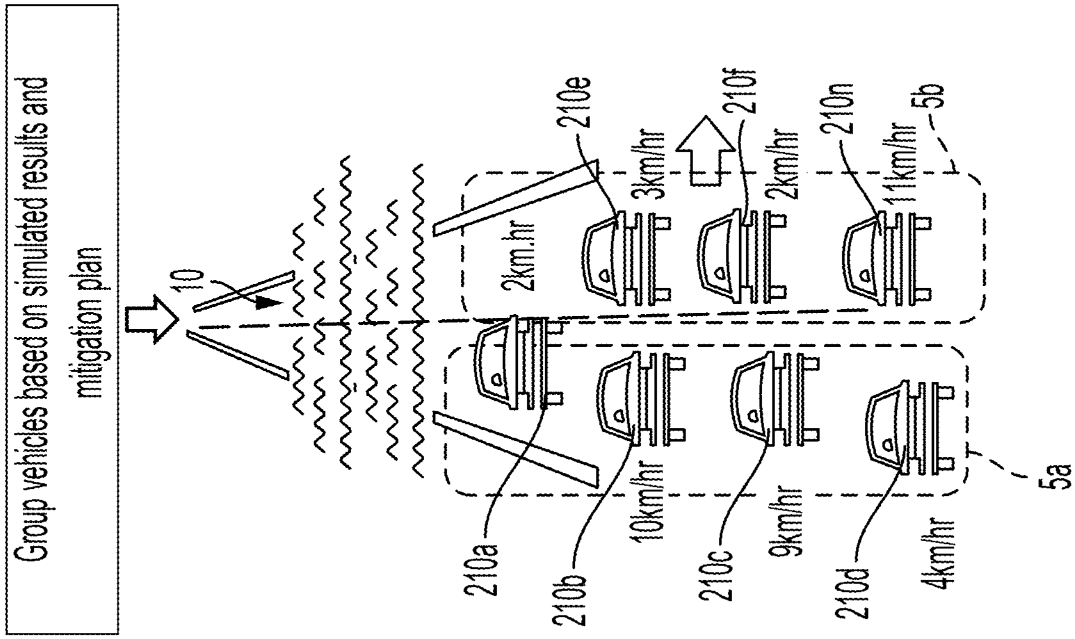
FIGS. 10A-10D depict a process performed by the proactive vehicle aquaplaning mitigation system to autonomously control and organize a group of vehicles according to an aquaplaning risk mitigation plan in accordance with one or more embodiments of the present invention.
Figure 10A:
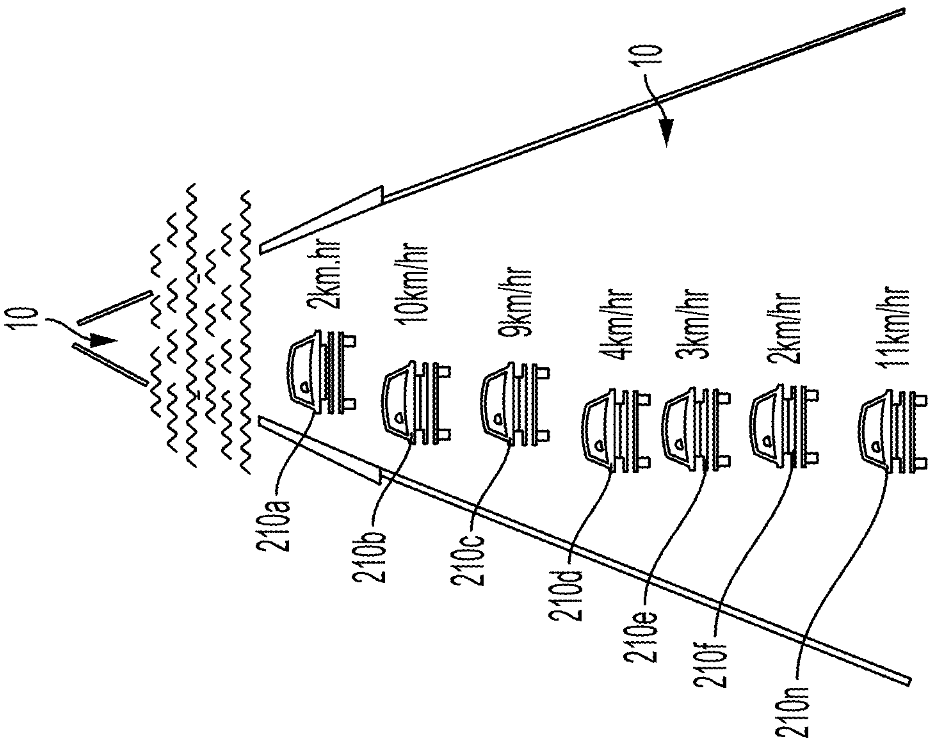
Figure 10D:
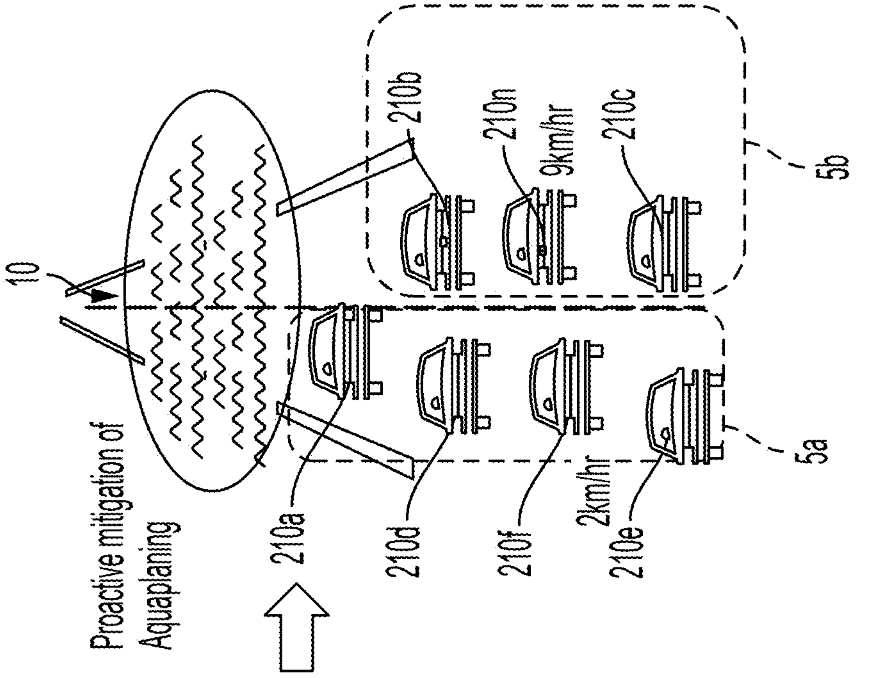

Turning now to FIGS. 10A, 10B, 10C and 10D (10A-10D), a process performed by the proactive vehicle aquaplaning mitigation system 200 to autonomously control and organize a group of vehicles according to an aquaplaning risk mitigation plan is illustrated according to non-limiting embodiments of the present invention. The proactive aquaplaning mitigation system 200 can dynamically categorize multiple vehicles 210*a*, 210*b*, 210*c*, 210*d*, . . . 210*n* (210*a*-210*n*) on a wet road 10 based on a range of simulated factors including, but not limited to, vehicle-specific parameters, road conditions, and environmental influences. Referring to FIG. 10A, for example, the controller 202 for each vehicle 210*a*-210*n* can calculate the maximum allowable speed for a given vehicle (210*a*-210*n*) by analyzing various factors such as vehicle type, weight, tire condition, and the specific characteristics of the road 10. The different speeds for each given vehicle 210*a*-210*b* can then be uploaded to a cloud server for access and/or shared directly between one or more of the vehicles 210*a*-210*n*.

In one or more embodiments, the proactive aquaplaning mitigation system 200 can monitor multiple vehicles 210*a*-210*n* traversing a wet road 10 and identify different factors and conditions (e.g., weight, tire condition, and wind resistance) that may affect each vehicle 210*a*-210*n*. The system's simulations account for these variables, resulting in varied permissible maximum speeds for different vehicles 210*a*-210*n*. Based on the different factors and conditions for each vehicle 210*a*-210*n*, the proactive vehicle aquaplaning mitigation system 200 can generate an aquaplaning mitigation plan that is used to organize the vehicles into one or more vehicle groups.

In terms of environments influences, the proactive aquaplaning mitigation system 200 take into account the impact of wind forces on the vehicles 210*a*-210*n*, for example, which can affect vehicle stability on the wet road 10. By simulating the effect of side winds, the proactive aquaplaning mitigation system 200 can calculate the additional force exerted on one or more of the vehicles 210*a*-210*n*, which could potentially lead to a loss of traction during aquaplaning conditions. This factor is integrated into the overall speed calculation, ensuring that the vehicles 210*a*-210*n* are not only protected from aquaplaning due to road water but also from destabilizing wind forces. The result is a more comprehensive safety profile for each vehicle 210*a*-210*n*.

After determining the maximum allowable speeds for individual vehicles, the controller 202 categorizes them into vehicle groups 5*a* and 5*b* with similar speed limits as shown in FIG. 10B. This categorization is based on the simulation results, which yield different allowed speeds for different the vehicles 210*a*-210*n*. By organizing individual vehicles 210*a*-210*n* with similar speeds capabilities into different vehicle groups 5*a* and 5*b*, the proactive aquaplaning mitigation system 200 can manage traffic flow more effectively during aquaplaning conditions and reduce the likelihood of accidents caused by speed disparities. In addition, each vehicle group 5*a* and 5*b* can be assigned a lowest allowed speed within a given group 5*a* and 5*b*, ensuring that all the vehicles 210*a*-210*n* in given vehicle group 5*a*, 5*b* operate within a safe range that considers the most vulnerable vehicle in the group 5*a*, 5*b*.

The proactive aquaplaning mitigation system 200 can also provide a dynamic adjustment mechanism that continuously updates the allowed speed limits for each vehicle group 5*a*, 5*b* during aquaplaning conditions. The dynamic adjustment mechanism can be achieved using real-time data collection of vehicle-generated data 250 provided by the sensors 212 and actively generated situational data 252 (e.g., simulations) that reflect the changing conditions of the road 10 and surrounding environment. Using V2X communication, for example, the proactive aquaplaning mitigation system 200 can share updated speed limits among the vehicles 210*a*-

210*n* within one or more vehicle 5*a*, 5*b* s to ensure that all the vehicles 210*a*-210*n* are informed of the current safe speed limits. In one or more non-limiting embodiments, one or a combination of vehicle speed, steering and braking of the vehicles in the first group (5*a*) can be controlled independent from the vehicle speed, steering and braking of the vehicles in the second group (5*a*). This continuous and active adjustment operation allows the proactive aquaplaning mitigation system 200 to respond quickly to changing conditions to maintain optimal safety during aquaplaning conditions.

Figure 10C:
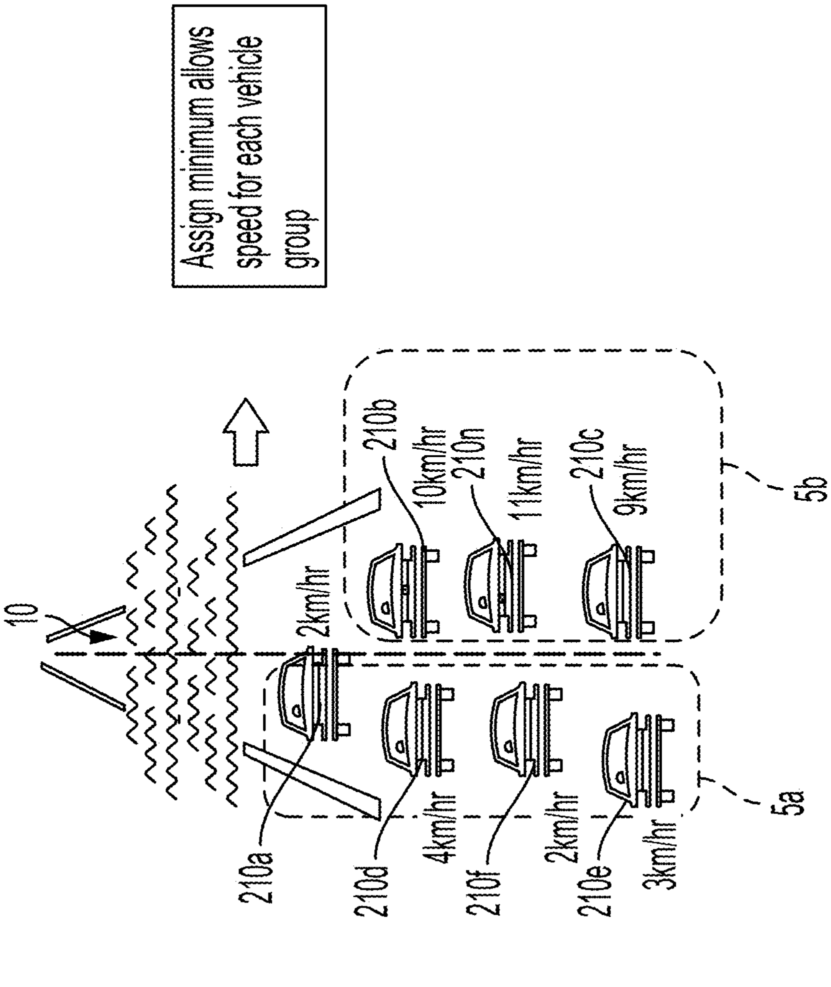

With continued reference to FIGS. 10B and 10C, the proactive aquaplaning mitigation system 200 can further optimize road safety and traffic flow by segmenting lanes of the road 10 and allocate each lane to one or more vehicle groups 5*a*, 5*b* that are grouped according to similar speed limits. This lane segmentation technique ensures that vehicle groups 5*a*, 5*b* of lower speed limits are not forced to interact with faster-moving traffic, thereby reducing the risk of collisions and enhancing overall traffic efficiency. In addition, aligning lane allocation with the categorized groups 5*a*, 5*b* not only maintains safety but also optimizes the speed of traffic to ensure that all vehicles 210*a*-210*n* move at an appropriate pace during aquaplaning conditions.

According to a non-limiting embodiment, the proactive aquaplaning mitigation system 200 can also utilize V2X communication to enable vehicles 210*a*-210*n* within one more vehicle groups 5*a*, 5*b* to share real-time information about accumulated water depth across different sections of the road 10. This shared information allows all vehicles 210*a*-210*n* in one or more of the vehicle groups 5*a*, 5*b* to make informed decisions about their speed and lane positioning based on emerging hazards, such as increasing water depth and/or changing road surfaces.

The proactive aquaplaning mitigation system 200 can also utilize the situational data 252 (e.g., AI and simulated data) to actively and continuously predict future road conditions based on weather forecasts, real-time data, historical patterns, changing road water depths, expected road profiles, etc. The active predictions allow the proactive aquaplaning mitigation system 200 to preemptively adjust speed limits for one or more of the vehicle groups 5*a*, 5*b*. For example, if the proactive aquaplaning mitigation system 200 predicts heavy rain along a certain stretch of road, the proactive aquaplaning mitigation system 200 can reduce the speed limits for vehicles 210*a*-210*n* in advance to ensure that they approach the hazardous area at a safe speed.

Figure 11A:
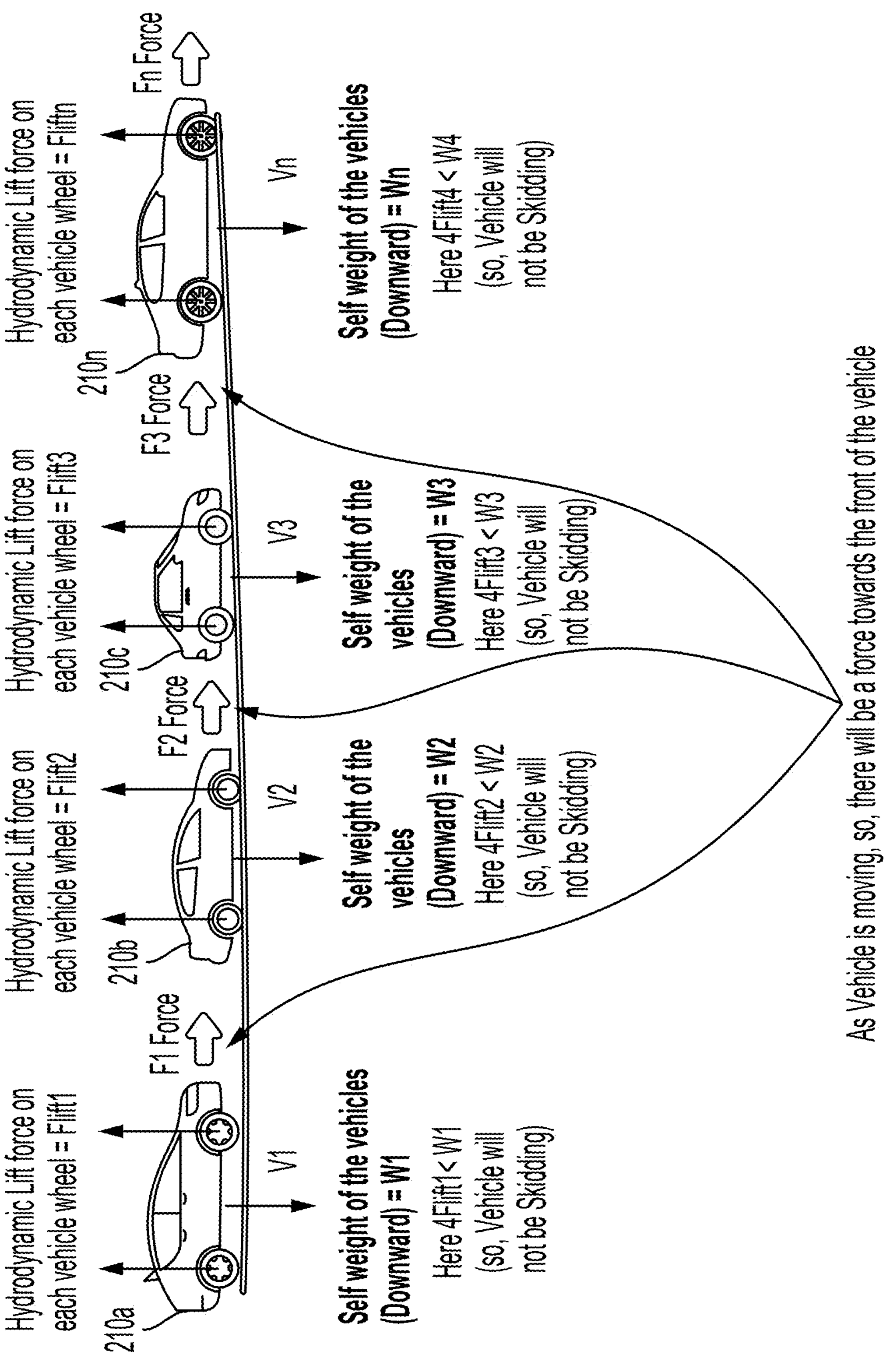
FIGS. 11A, 11B and 11C depict a process performed by the proactive vehicle aquaplaning mitigation system to autonomously organize, couple, and control a group of vehicles to mitigate aquaplaning in accordance with one or more embodiments of the present invention.
Figure 11B:
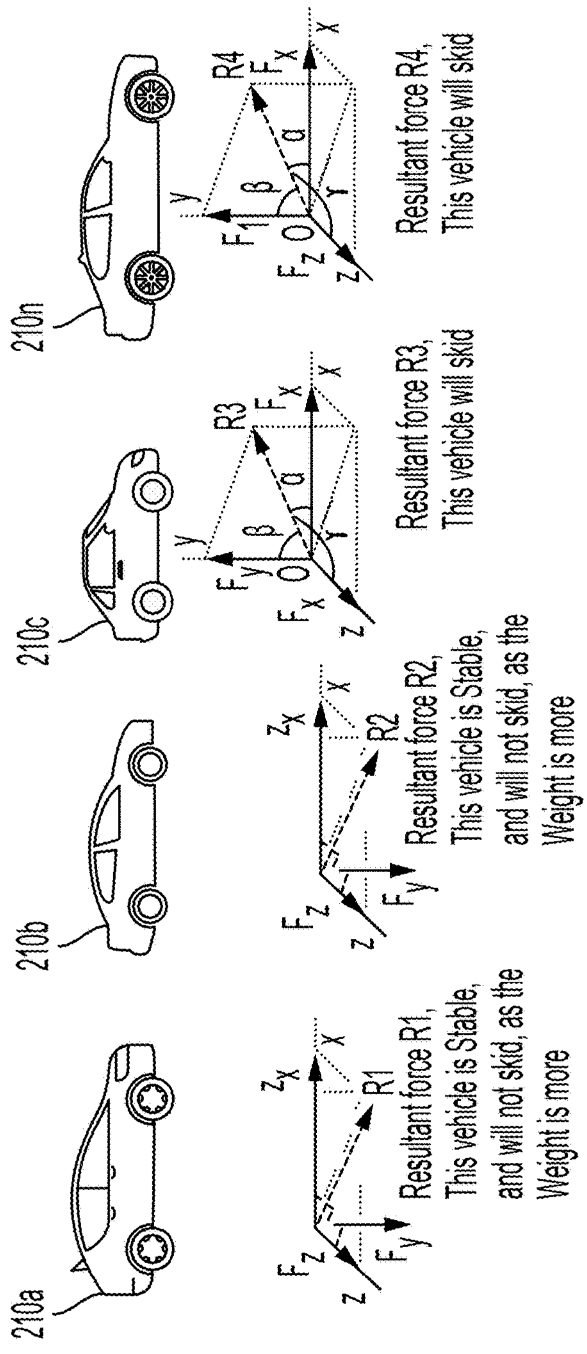
Figure 11C:
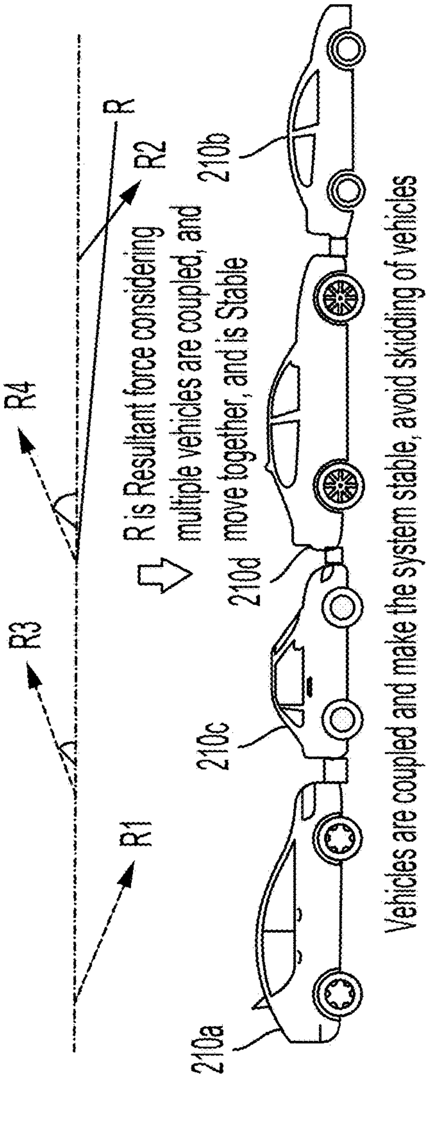

Turning now to FIGS. 11A, 11B and 11C (FIGS. 11A-11C), a process performed by the proactive vehicle aquaplaning mitigation system 200 to mitigate aquaplaning by autonomously organizing, coupling, and controlling a group of vehicles is illustrated according to non-limiting embodiments of the present invention. As described herein, each vehicle 210*a*, 210*b*, 210*c*, . . . 210*n*) (210*a*-210*n*) can calculate a resultant force on each vehicle, and based on situation data 252 (e.g., AI, simulations etc.) can determine how to organize the vehicles 210*a*-210*n* so that their aggregated resultant forces can achieve a stable vehicle group during aquaplaning conditions.

Turning to FIG. 11A, for example, the proactive vehicle aquaplaning mitigation system 200 determines the Flint, the forward force (F1-Fn) and the vehicle weight (W1-WN) for each respective vehicle 210*a*-210*n*. In FIG. 11B, the resultant force (R1-Rn) is determined for each vehicle 210*a*-210*n* based on the $F_{lift}$, the forward force (F1-Fn) and the vehicle weight (W1-WN). Based on the resultant force, the proactive vehicle aquaplaning mitigation system 200 determines whether a given vehicle 210*a*-210*n* will skid or not skid, i.e., will encounter an aquaplaning event. In FIG. 11B, the vehicles are shown after proactive vehicle aquaplaning mitigation system 200 autonomously organizes and couples them together based on their respective resultant forces R1-Rn. Accordingly, the group of coupled vehicles 210*a*-210*n* can be autonomously controlled and driven in a stable manner while avoiding aquaplaning events.

Figure 12:
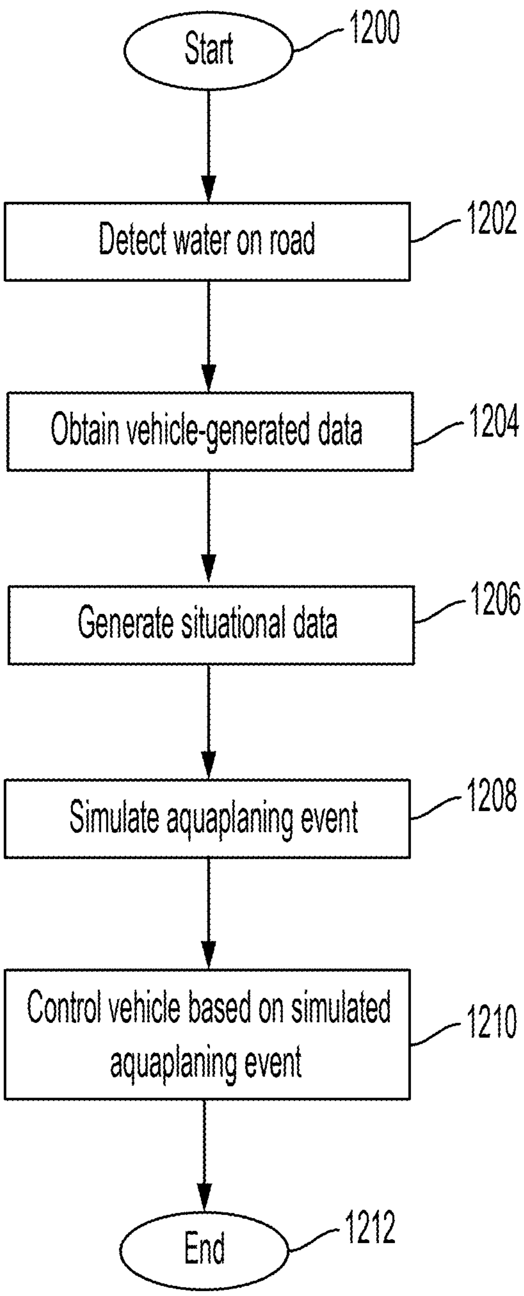
FIG. 12 is flow diagram illustrating a method of performing proactive vehicle aquaplaning mitigation in accordance with one or more embodiments of the present invention.

Referring to FIG. 12, a method of performing proactive vehicle aquaplaning mitigation in accordance with one or more embodiments of the present invention. The method begins at operation 1200, and detects water on the road during driving of a vehicle at operation 1202. At operation 1204, vehicle-generated data is obtained. The vehicle generated data can be obtained using one or more sensors installed on the vehicle and/or can be calculated using data or information provided by the sensors. At operation 1206, situational data is generated based, at least in part, on the vehicle generated data. As described herein, the situational data can include historically learned data, learned data generated by one or more machine learning techniques, training data, predicted data, simulated/virtually generated data, augmented reality (AR) data, and/or artificial intelligence (AI) produced data generated by one or more AI algorithms. At operation 1208, one or more aquaplaning events are simulated using the vehicle generated data and the situational data. At operation 1210, the vehicle is controlled (e.g., using AR guidance and/or autonomous control) based, at least in part, on the simulated aquaplaning event, the method ends at operation 1212.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over conventional technologies, or to enable others of ordinary skill in the art to understand the embodiments described herein.

What is claimed is:

1. A computer-implemented method comprising:
- detecting water on a road on which at least one vehicle travels;
- obtaining vehicle-generated data based on the water and operation of the at least one vehicle;
- generating situational data based on the vehicle-generated data;
- generating a simulated aquaplaning event corresponding to the at least one vehicle based on one or both of the vehicle-generate data and the situational data; and
- controlling the at least one vehicle based on the simulated aquaplaning event,
- wherein generating the simulated aquaplaning event includes calculating a lift force based on water depth and a road profile at a plurality of positions along the road, and
- wherein controlling the at least one vehicle includes determining a maximum allowable speed of the vehicle for at least one of the plurality of positions along the road based on the simulated aquaplaning event.

2. The computer-implemented method of claim 1, wherein the at least one vehicle includes a plurality of vehicles, and wherein controlling the at least one vehicle includes autonomously controlling one or a combination of vehicle speed, steering and braking of the plurality of vehicles.

3. The computer-implemented method of claim 2, wherein controlling the at least one vehicle includes:
- determining a first speed of a first vehicle included in the plurality of vehicles, and determining a second speed different from the first speed of a second vehicle included in the plurality of vehicles;
- assigning the first vehicle to a first group based on the first speed and assigning the second vehicle to a second group based on the second speed; and
- autonomously controlling one or a combination of vehicle speed, steering and braking of the first vehicle and controlling one or a combination of vehicle speed, steering and braking of the second vehicle independently from the vehicle speed, steering and braking of the first vehicle.

4. The computer-implemented method of claim 2, wherein controlling the at least one vehicle includes:
- determining a lift force (Flift), a forward force (Fn) and a weight (Wn) for each vehicle among the plurality of vehicles;
- determining a resultant force for each vehicle based on the lift force (Flift), a forward force (Fn) and a weight (Wn);
- coupling the plurality of vehicles into a group based on the resultant force of each vehicle among the plurality of vehicles; and
- autonomously controlling one or a combination of vehicle speed, steering and braking of the plurality of vehicles while coupled together in the group.

5. The computer-implemented method of claim 1, wherein the situational data includes augmented reality (AR)

data, and wherein controlling the at least one vehicle includes guiding the at least one vehicle using the AR data.

6. The computer-implemented method of claim 5, wherein guiding the at least one vehicle includes displaying the AR data to an occupant of the at least one vehicle, and wherein the at least one vehicle is controlled based on the displayed AR data.

7. The computer-implemented method of claim 1, wherein controlling the at least one vehicle includes autonomously controlling one or a combination of vehicle speed, steering and braking.

8. The computer-implemented method of claim 1, wherein controlling the at least one vehicle includes activating an air jet installed on the at least one vehicle to output a stream of air toward the road to disperse the water away from the at least one vehicle.

9. A system comprising:

at least one sensor configured to output at least one signal indicating water on a road on which at least one vehicle travels and vehicle-generated data resulting from operation of the at least one vehicle; and a controller in signal communication with the at least one sensor and the at least one vehicle, the controller configured to receive the signal and to:

generate situational data based on the vehicle-generated data;

generate a simulated aquaplaning event corresponding to the at least one vehicle based on one or both of the vehicle-generate data and the situational data; and control the at least one vehicle based on the simulated aquaplaning event, wherein generating the simulated aquaplaning event includes calculating a lift force based on water depth and a road profile at a plurality of positions along the road, and wherein controlling the at least one vehicle includes determining a maximum allowable speed of the vehicle for at least one of the plurality of positions along the road based on the simulated aquaplaning event.

10. The system of claim 9, wherein the at least one vehicle includes a plurality of vehicles, and wherein the controller is configured to control the at least one vehicle autonomously by controlling one or a combination of vehicle speed, steering and braking of the plurality of vehicles.

11. The system of claim 10, wherein controlling the at least one vehicle includes:

determining a first speed of a first vehicle included in the plurality of vehicles, and determining a second speed different from the first speed of a second vehicle included in the plurality of vehicles;

assigning the first vehicle to a first group based on the first speed and assigning the second vehicle to a second group based on the second speed; and autonomously controlling one or a combination of vehicle speed, steering and braking of the first vehicle and controlling one or a combination of vehicle speed, steering and braking of the second vehicle independently from the vehicle speed, steering and braking of the first vehicle.

12. The system of claim 10, wherein controlling the at least one vehicle includes:

determining a lift force (Flift), a forward force (Fn) and a weight (Wn) for each vehicle among the plurality of vehicles;

determining a resultant force for each vehicle based on the lift force (Flift), a forward force (Fn) and a weight (Wn);

coupling the plurality of vehicles into a group based on the resultant force of each vehicle among the plurality of vehicles; and autonomously controlling one or a combination of vehicle speed, steering and braking of the plurality of vehicles while coupled together in the group.

13. The system of claim 9, wherein the situational data includes augmented reality (AR) data, and wherein the controller is configured to control the at least one vehicle by guiding the at least one vehicle using the AR data.

14. The system of claim 13, wherein guiding the at least one vehicle includes displaying the AR data to an occupant of the at least one vehicle, and wherein the at least one vehicle is controlled based on the displayed AR data.

15. The system of claim 9, wherein the controller is configured to control the at least one vehicle autonomously by controlling one or a combination of vehicle speed, steering and braking.

16. The system of claim 9, wherein controlling the at least one vehicle includes activating an air jet installed on the at least one vehicle to output a stream of air toward the road to disperse the water away from the at least one vehicle.

17. A computer program product to control an electronic device to perform proactive vehicle aquaplaning mitigation, the computer program product comprising a computer readable storage medium having program instructions embodied therewith, the program instructions executable by an electronic computer processor to control the electronic device to perform operations comprising:

detect water on road on which at least one vehicle travels;

obtain vehicle-generated data from the at least one vehicle;

generate situational data based on the vehicle-generated data;

generate a simulated aquaplaning event corresponding to the at least one vehicle based on one or both of the vehicle-generate data and the situational data; and control the at least one vehicle based on the simulated aquaplaning event, wherein generating the simulated aquaplaning event includes calculating a lift force based on water depth and a road profile at a plurality of positions along the road, and wherein controlling the at least one vehicle includes determining a maximum allowable speed of the vehicle for at least one of the plurality of positions along the road based on the simulated aquaplaning event.

18. The computer program product of claim 17, wherein controlling the at least one vehicle includes autonomously controlling one or a combination of vehicle speed, steering and braking.

19. The computer program product of claim 17, wherein the situational data includes augmented reality (AR) data, and wherein controlling the at least one vehicle includes guiding the at least one vehicle using the AR data.

20. The computer program product of claim 17, wherein controlling the at least one vehicle includes activating an air jet installed on the at least one vehicle to output a stream of air toward the road to disperse the water away from the at least one vehicle.

* * * * *